United States Patent
Fröhlich et al.

(10) Patent No.: US 12,103,254 B2
(45) Date of Patent: Oct. 1, 2024

(54) METHOD FOR PRODUCING AN OPTICAL ELEMENT, FOR EXAMPLE A HEADLIGHT LENS FOR A MOTOR VEHICLE HEADLIGHT

(71) Applicant: Docter Optics SE, Neustadt an der Orla (DE)

(72) Inventors: Sven Fröhlich, Neustadt an der Orla (DE); Fiete Bauer, Neustadt an der Orla (DE)

(73) Assignee: DOCTER OPTICS SE, Neustadt An der Orla (DE)

( * ) Notice: Subject to any disclaimer, the term of this patent is extended or adjusted under 35 U.S.C. 154(b) by 0 days.

(21) Appl. No.: 17/767,090

(22) PCT Filed: Oct. 6, 2020

(86) PCT No.: PCT/DE2020/100860
§ 371 (c)(1),
(2) Date: Apr. 7, 2022

(87) PCT Pub. No.: WO2021/069026
PCT Pub. Date: Apr. 15, 2021

(65) Prior Publication Data
US 2022/0363023 A1   Nov. 17, 2022

(30) Foreign Application Priority Data

Oct. 9, 2019   (DE) .................... 10 2019 127 204.1
Oct. 18, 2019   (DE) .................... 10 2019 128 236.5
Jul. 17, 2020   (DE) .................... 10 2020 119 043.3

(51) Int. Cl.
   *B29D 11/00*   (2006.01)

(52) U.S. Cl.
   CPC .. *B29D 11/00211* (2013.01); *B29D 11/00134* (2013.01); *B29D 11/0048* (2013.01); *B29D 11/00769* (2013.01)

(58) Field of Classification Search
   CPC ........ B29D 11/00211; B29D 11/00134; B29D 11/0048; B29D 11/00769
   See application file for complete search history.

(56) References Cited

U.S. PATENT DOCUMENTS

| 821,610 A | 5/1906 | Cox |
| 4,666,496 A | 5/1987 | Fecik |

(Continued)

FOREIGN PATENT DOCUMENTS

| CN | 1752165 | * 3/2006 |
| CN | 205049796 | 2/2016 |

(Continued)

OTHER PUBLICATIONS

International Preliminary Report On Patentability Issued On Apr. 12, 2022 For Corresponding PCT Application No. PCT/DE2020/100860.

(Continued)

*Primary Examiner* — Mathieu D Vargot
(74) *Attorney, Agent, or Firm* — DUANE MORRIS LLP

(57) ABSTRACT

The present disclosure relates to a method for producing an optical element, for example a lens, for example a headlight lens, for example for vehicle headlights or motor vehicle headlights, wherein an optical component part having an (optically effective) convex surface made of a first transparent optical material is provided and/or produced; a mold having a concave cavity and optical material is provided and/or produced; liquid transparent second optical material is placed into the concave cavity of the mold; and the optical component part having the convexly curved surface is (Continued)

pressed into the concave cavity of the mold such that an optically effective coating is formed on the convexly curved surface.

19 Claims, 18 Drawing Sheets

(56) References Cited

U.S. PATENT DOCUMENTS

| | | |
|---|---|---|
| 5,120,343 A | 6/1992 | Monji et al. |
| 6,130,777 A | 10/2000 | Yamashita et al. |
| 7,798,688 B2 | 9/2010 | Hamkens |
| 2001/0033726 A1 | 10/2001 | Shie et al. |
| 2002/0153624 A1 | 10/2002 | Tumlin et al. |
| 2003/0001301 A1 | 1/2003 | Duroux et al. |
| 2004/0244421 A1 | 12/2004 | Kato et al. |
| 2005/0054514 A1 | 3/2005 | Ishioka et al. |
| 2009/0323502 A1 | 12/2009 | Murata et al. |
| 2010/0246008 A1 | 9/2010 | Murata et al. |
| 2011/0266576 A1 | 11/2011 | Engl et al. |
| 2012/0040044 A1 | 2/2012 | Uehira et al. |
| 2013/0221551 A1 | 8/2013 | Genda |
| 2014/0332991 A1 | 11/2014 | Giessauf et al. |
| 2015/0224723 A1 | 8/2015 | Hamkens |
| 2017/0327402 A1 | 11/2017 | Fujii |
| 2018/0251395 A1 | 9/2018 | Akiba et al. |
| 2018/0328558 A1 | 11/2018 | Okubo |
| 2019/0041556 A1 | 2/2019 | Iwata |
| 2020/0195823 A1 | 6/2020 | Furutake |
| 2022/0373151 A1 | 11/2022 | Zhang et al. |

FOREIGN PATENT DOCUMENTS

| | | |
|---|---|---|
| CN | 105819674 | 8/2016 |
| DE | 1 099 964 | 2/1961 |
| DE | 2906858 | 9/1980 |
| DE | 36 02 262 | 5/1987 |
| DE | 299 14 114 | 11/1999 |
| DE | 69701714 | 2/2001 |
| DE | 102 26 471 | 1/2004 |
| DE | 10 2005 009 556 | 9/2005 |
| DE | 10 2008 034153 | 1/2010 |
| DE | 102008054029 | 5/2010 |
| DE | 102012205196 | 10/2013 |
| DE | 20 2014 100462 | 3/2014 |
| DE | 10 2015 001609 | 8/2016 |
| DE | 10 2015 007 832 | 12/2016 |
| DE | 10 2017 105 888 | 9/2018 |
| DE | 10 2015 012 324 | 6/2019 |
| DE | 10 2020 115078 | 1/2021 |
| EP | 2402140 | 1/2012 |
| EP | 2666620 | 11/2013 |
| EP | 3312501 | 4/2018 |
| EP | 3520983 | 8/2019 |
| EP | 3575362 | 12/2019 |
| JP | 01072822 | 3/1989 |
| JP | H06-286754 | 10/1994 |
| JP | H07330347 A | 12/1995 |
| JP | 2002160256 | 6/2002 |
| JP | 2006062359 | 3/2006 |
| JP | 2010046895 | 3/2010 |
| JP | 2018118900 | 8/2018 |
| JP | 2019135202 | 8/2019 |
| KR | 20160028901 | 3/2016 |
| WO | 2004/096724 | 11/2004 |
| WO | 2009/036739 | 3/2009 |
| WO | 2009/109209 | 9/2009 |
| WO | 2012072192 | 6/2012 |
| WO | 2014/161014 | 10/2014 |
| WO | 2017/207079 | 12/2017 |
| WO | WO 2017/215775 | * 12/2017 |
| WO | 2019/072326 | 4/2019 |
| WO | 2019/179571 | 9/2019 |
| WO | 2021/008657 | 1/2021 |
| WO | 2021008647 | 1/2021 |

OTHER PUBLICATIONS

International Preliminary Report On Patentability Issued in Corresponding PCT Application No. PCT/DE2021/100136 Dated Aug. 23, 2022.
International Search Report Issued Jan. 26, 2021 For Corresponding PCT Application No. PCT/DE2020/100860.
International Search Report and Written Opinion Issued May 6, 2021 For PCT/DE2021/100035.
International Preliminary Report On Patentability Issued On Jul. 19, 2022 For Corresponding PCT Application No. PCT/DE2021/100035.
International Search Report and Written Opinion Issued May 25, 2021 For PCT/DE2021/100136.
International Search Report and Written Opinion Issued May 20, 2019 For Corresponding PCT Application No. PCT/DE2019/100249.
International Preliminary Report On Patentability Issued On Jan. 18, 2022 In Corresponding PCT Application No. PCT/DE2020/100478.
International Search Report and Written Opinion Issued On Sep. 16, 2020 In Corresponding PCT Application No. PCT/DE2020/100478.
Office Action Dated Mar. 20, 2020 For Corresponding Patent Application No. DE 10 2019 119 040.1.
Office Action Dated Feb. 19, 2020 For Corresponding Patent Application No. DE 10 2019 119 042.8.
International Preliminary Report On Patentability Issued On Jan. 18, 2022 In Corresponding PCT Application No. PCT/DE2020/100609.
International Search Report and Written Opinion Issued On Oct. 16, 2020 In Corresponding PCT Application No. PCT/DE2020/100609.
International Preliminary Report On Patentability Issued On Sep. 22, 2020 For Corresponding PCT Application No. PCT/DE2019/100249.
German Office Action Dated Jul. 13, 2021 For Corresponding Patent Application No. DE 10 2020 127 638.9.
International Search Report and Written Opinion Issued On Apr. 8, 2021 In Corresponding PCT Application No. PCT/DE2020/101007.
International Preliminary Report On Patentability Issued On May 17, 2022 For Corresponding PCT Application No. PCT/DE2020/101007.
Search Report Issued On Nov. 22, 2021 For Corresponding Patent Application No. DE 10 2021 105 560.1.
International Search Report and Written Opinion Issued On Feb. 4, 2022 For Corresponding PCT Application No. PCT/DE2021/100840.
International Search Report and Written Opinion Issued Feb. 1, 2022 For Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels- Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
von Alfred Vollmer, "Matrix-LED- und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern- und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.

(56) References Cited

OTHER PUBLICATIONS

International Preliminary Report On Patentability Issued May 8, 2023 For PCT/DE2021/100858.

* cited by examiner

METHOD FOR PRODUCING AN OPTICAL ELEMENT, FOR EXAMPLE A HEADLIGHT LENS FOR A MOTOR VEHICLE HEADLIGHT

FIELD OF THE INVENTION

The present disclosure relates to a method for producing an optical element, for example a lens, for example a headlight lens, for example for vehicle headlights or motor vehicle headlights. The optical element is thereby for example a hybrid element or a polymer hybrid element.

The present disclosure concerns a method for producing an optical element, for example a lens, for example a hybrid headlight lens, for example for vehicle headlights or motor vehicle headlights, wherein a partial-optic with an (optically effective) coating surface of a first transparent optical material is provided and/or produced, wherein a mold with a cavity is provided and/or produced, wherein liquid transparent second optical material is placed into the, cavity of the mold and/or onto the partial-optic, wherein the partial-optical, for example with the coating surface, is pressed into the cavity of the mold.

DETAILED DESCRIPTION

Figure 1:
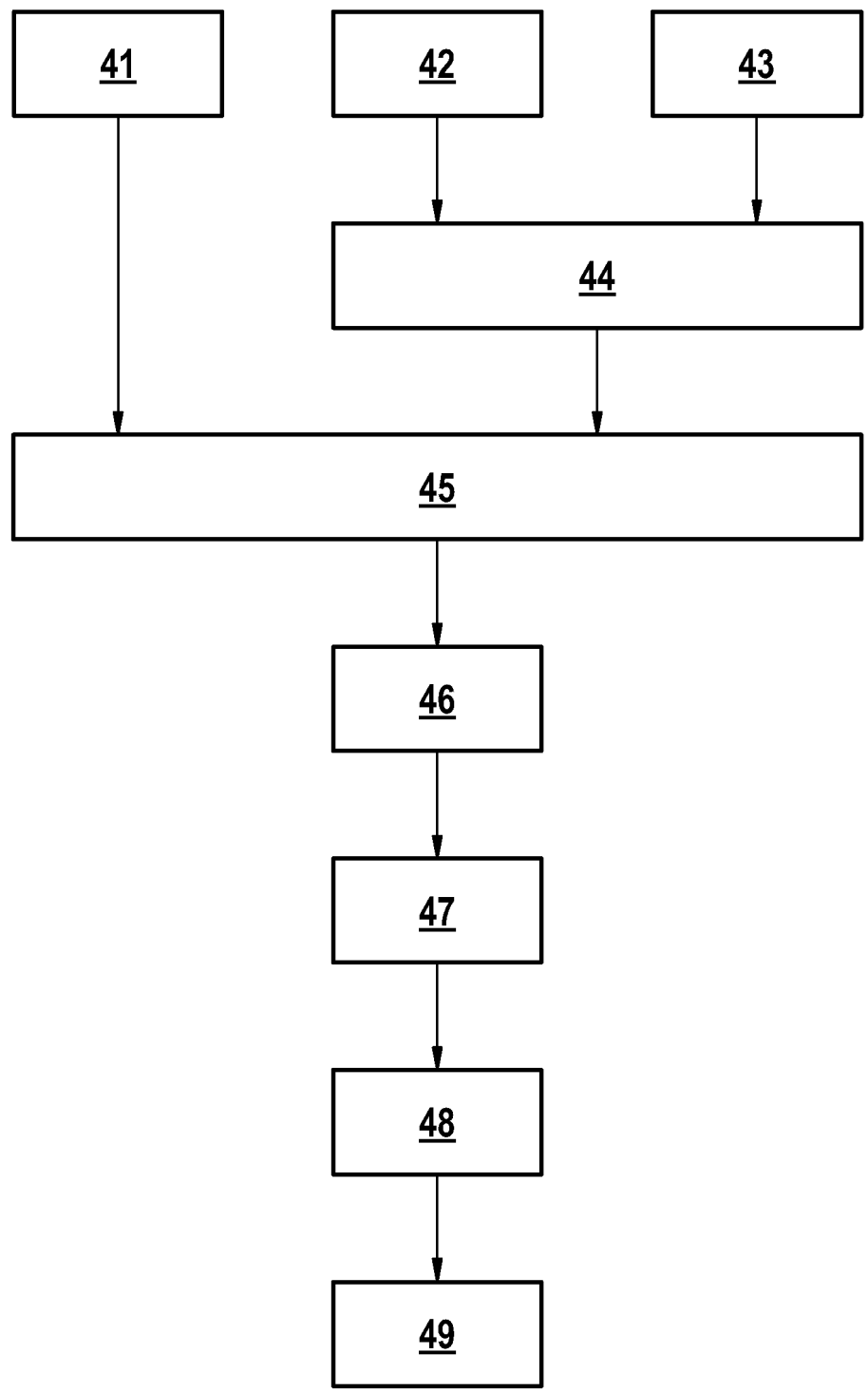
FIG. 1 shows an embodiment of a method for manufacturing a hybrid lens according to FIG. 8.

The present disclosure concerns a method for producing an optical element, for example a lens, for example a hybrid headlight lens, for example for vehicle headlights or motor vehicle headlights, wherein a partial-optic with an (optically effective), for example convex, coating surface of a first transparent optical material is provided and/or produced, wherein a mold with a, for example concave, cavity is provided and/or produced, wherein liquid transparent second optical material is placed into the, for example concave, cavity of the mold and/or onto the partial-optic, wherein the partial-optical, for example with the, for example convexly curved, coating surface, is pressed into the, for example concave, cavity of the mold, e.g. under vacuum or under negative pressure, for example with the, for example convexly curved, coating surface into the, for example concave, cavity of the mold, e.g. under vacuum or under negative pressure, such that an optically effective coating is formed or can be formed (e.g. by means of further process steps), for example on the, for example convexly curved, coating surface.

Liquid transparent second optical material may be or comprise, for example, transparent second optical material mixed with a solvent.

The first optical material is for example inorganic glass. Inorganic glass in the sense of this disclosure is for example silicate glass. Glass within the meaning of this disclosure is for example glass as described in WO 2009/109209 A1. Glass within the meaning of this disclosure comprises for example 0.2 to 2 wt.-% $Al_2O_3$, 0.1 to 1 wt.-% $Li_2O$,
0.3, especially 0.4, to 1.5 wt.-% $Sb_2O_3$,
60 to 75 wt.-% $SiO_2$,
3 to 12 wt.-% $Na_2O$,
3 to 12 wt.-% $K_2O$ and
3 to 12 wt.-% $CaO$,
such as DOCTAN®.

The second optical material is for example a transparent ink for printing (three-dimensional) optical structures. The second optical material is for example a hybrid polymer, such as Ormocer or OrmoInk. For example, a hybrid polymer "ink" is used. For example, the ink contains Ormocer. For example, inorganic-organic hybrid polymers, so-called ormocers, or precursors of such hybrid polymers, which polymerize by UV exposure, are provided as starting material for the ink. Depending on the boundary conditions of the printing process, these are mixed with a solvent or other diluents, e.g. (so-called) reactive diluents, to adjust the viscosity of the ink.

In one embodiment, the partial-optic is manufactured by press molding, for example press molding on both sides, for example according to a process corresponding to WO 2019/072325 A1, German patent application 10 2019 119 042.8 and/or German patent application 10 2020 115 078.4. For the purposes of this disclosure, press molding is to be understood for example as pressing a (optically effective) surface in such a way that subsequent post-processing of the contour of this (optically effective) surface by removing material can be omitted or is omitted or is not provided. Thus, it is for example intended that a press molded surface is not grinded after the press molding. Polishing, which does not affect the contour of the surface but does affect the surface finish, may be provided.

In an illustrative embodiment, the coating is not thicker than 2 mm, for example not thicker than 1.5 mm. In an illustrative embodiment, the coating is at least 0.5 mm thick. In an illustrative embodiment, the coating has no steps on its surface, for example no step in the direction of the optical axis of the optical element. For example, it is provided that the first derivative of the surface of the coating is also continuous, for example has no step, for example no step in the direction of the optical axis of the optical element. The first derivative of the surface of the coating, which is a function $f$ of the coordinates x and y is e.g.

$$\frac{df(x, y)}{dx}$$

respectively $$\frac{df(x, y)}{dy}$$

In an illustrative embodiment, the mold is oriented such that the cavity, for example the concave cavity, is directed upward. In an illustrative embodiment, the mold has a first mold material and a second mold material or consists essentially of the first mold material and the second mold material. This may be true with respect to headlight lenses, for example for vehicle headlights or motor vehicle headlights. In an illustrative embodiment, the mold comprises a carrier mold and an impression mold within a cavity of the carrier mold. The impression mold comprises an impression surface for forming the, for example convexly curved, coating surface from the second transparent lens material. In one illustrative embodiment, the first mold material and/or the second mold material is transparent. For example, it is provided that the second molding material is or comprises silicone and/or silicone rubber. Transparent in the context of molding material is intended to mean, for example, that the material is transparent to UV light. Transparent in the context of optical material shall for example mean that the material is transparent for light in the visible range (covering completely or at least a partial range of the visible range) and/or for light in the UV range.

It may be provided that the first optical material and the second optical material have (substantially) the same refractive index. In this case, the coated surface of the partial-optic loses its optical effectiveness due to the coating. A light refractive index or refractive index in the sense of the present disclosure is for example equal to a light refractive index or refractive index if the light refractive index or refractive index differs from the light refractive index or refractive index by no more than 20%, for example by no more than 15%, for example by no more than 10%, for example by no more than 5%.

It may be provided that the partial-optic is formed or pressed with a rim or a lens edge. A rim or lens edge in the sense of this disclosure is for example three-dimensional. A rim or a lens edge in the sense of the present disclosure for example has a volume. An edge or a lens edge in the sense of this disclosure comprises for example a support shoulder in the direction of the curved surface. It may be provided that the support shoulder is used as a reference or reference surface when forming or pressing the coating. For example, it is provided that the support shoulder is in a fixed relationship to the (press molded) convex surface.

In one illustrative embodiment, the coating is irradiated with UV light. In one illustrative embodiment, the coating is irradiated with UV light through the mold. In one illustrative embodiment, the coating is irradiated with UV light through the support mold. In one illustrative embodiment, the coating is irradiated with UV light through the impression mold. In one illustrative embodiment, the coating is irradiated with UV light through the partial-optic.

The process described can also be carried out in conjunction with pressing under vacuum or near-vacuum or at least negative pressure (see above). Negative pressure in the sense of this disclosure is for example a pressure which is not greater than 0.5 bar, for example not greater than 0.3 bar, for example not less than 0.1 bar, for example not greater than 0.05 bar, for example not less than 0.2 bar. Vacuum or near-vacuum in the sense of this disclosure is for example a pressure which is not greater than 0.1 bar, for example not greater than 0.01 bar, for example not greater than 0.001 bar. Vacuum or near-vacuum in the sense of this disclosure is for example a pressure that is not smaller than 0.01 bar, for example not smaller than 0.001 bar, for example not smaller than 0.0001 bar.

Suitable methods are disclosed, for example, in JP 2003-048728 A (incorporated by reference in its entirety) and WO 2014/131426 A1 (incorporated by reference in its entirety). In a corresponding embodiment, a bellows as disclosed at least in a similar manner in WO 2014/131426 A1 may be provided. It may be provided that the optical element is manufactured in such a way by means of the carrier mold/impression mold, (a) in that the partial-optic and the carrier mold/impression mold are (positioned relative to one another and)

moved toward one another without the partial-optic and the carrier mold/impression mold forming a (closed) overall mold or cavity, (b) wherein (subsequently or thereafter) a seal is closed to create an airtight space in which the partial-optic and the carrier mold/impression mold are disposed, (c) wherein (subsequently or thereafter) a negative pressure or near vacuum or vacuum is created in the airtight space, (d) wherein (subsequently or thereafter) the partial-optic and the carrier mold/impression mold are moved (for example vertically) toward each other to form the optical element, wherein for example it is provided that the partial-optic and the carrier mold/impression mold form a closed overall mold, (e) and wherein (subsequently or thereafter) the coating is irradiated with UV light (for curing).

The partial-optic and the carrier mold/impression mold can be moved toward each other by moving the partial-optic toward the carrier mold/impression mold and/or the carrier mold/impression mold toward the partial-optic (vertically).

In an illustrative embodiment.

(f) (following step (e) or after step (e)) normal pressure is generated in the airtight space. Normal pressure in the sense of the present disclosure is for example atmospheric (air) pressure. Normal pressure in the sense of the present disclosure is for example the pressure or air pressure prevailing outside the seal. Subsequently or thereafter, in an illustrative embodiment, the seal is opened or returned to its initial position.

In an illustrative embodiment.

(g) (subsequently or afterwards or during step (f) the carrier mold/impression mold and the partial-optic are moved apart.

Alternatively, a chamber can be provided which encloses the partial-optic and the carrier mold/impression mold in such a way that coating of the partial-optic takes place under negative pressure or near vacuum or vacuum.

It can be provided that both the convex surface and the plane surface are coated. It may be provided that the plane surface is printed by means of a 3D printing process. For example, it may be provided that the plane surface is coated by a 3D printing process, whereas the convex coating surface is coated by pressing by means of the described process.

It can be provided for example that the coating has light-diffracting or diffractive structures. For example, it is envisaged that the coating comprises light-diffracting structures for chromatic correction, i.e. for suppressing or reducing color fringes.

It may be envisaged that the optical element or the corresponding hybrid lens, for example, is assembled with further optical elements or lenses to form an objective and or is assembled together with a detector to form a sensor. An exemplary application is disclosed in German patent application 10 2019 126 419.7. For example, it can be provided that the coating has light-diffracting or diffractive structures that are, for example, tuned to the wavelengths. A sensor mentioned above can be a finger scanner, for example. It can be provided that the optical element or the corresponding hybrid lens, for example assembled with further optical elements or lenses to form an objective, images the measurement area on a detector or generates an image of a finger in the measurement area on a detector.

The optical element (according to the present disclosure) or a corresponding lens is also used, for example, in a projection headlight. In the design as a headlight lens for a projection headlight, the optical element or a corresponding headlight lens images the edge of a shield as the bright-dark-boundary on the road.

The present disclosure concerns further a method of manufacturing a vehicle headlight, wherein an optical element manufactured by a method having one or more of the aforementioned features is installed in a headlight and/or a headlight housing.

The present disclosure concerns further a method for manufacturing a vehicle headlight, wherein an optical element manufactured by a method having one or more of the aforementioned features is placed in a headlight housing and is assembled together with at least one light source or a plurality of light sources to form a vehicle headlight.

The present disclosure concerns further a method for producing a vehicle headlight, wherein an optical element produced by a method having one or more of the aforementioned features is placed in a headlight housing as a secondary optic or as part of a secondary optic comprising a plurality of lenses for imaging a light output surface of an attachment optics and/or an illumination pattern generated by means of a primary optic and is assembled together with at least one light source or a plurality of light sources and the attachment optics to form a vehicle headlight.

The present disclosure concerns further a method of manufacturing a vehicle headlight, wherein a primary optic or an attachment optics array as primary optic is manufactured in accordance with a method having one or more of the foregoing features for generating the illumination pattern.

In a matrix headlight, the optical element or a corresponding hybrid headlight lens is used, for example, as a secondary lens for imaging an attachment optics. An attachment optics within the meaning of this disclosure is arranged for example between the secondary optic and a light source arrangement. An attachment optics in the sense of the present disclosure is for example arranged in the light path between the secondary optic and the light source arrangement. An attachment optics in the sense of this disclosure is for example an optical component for shaping a light distribution in dependence on light generated by the light source arrangement and irradiated by the latter into the attachment optics. In this context, the generation or shaping of a light distribution is performed, for example, by TIR, i.e., by total internal reflection. An attachment optics in the sense of the present disclosure is for example an "inverted" or an "inversely arranged" concentrator. An attachment optics in the sense of the present disclosure is for example a non-imaging optic.

The optical element or the corresponding hybrid lens or hybrid headlight lens may be used in connection with adaptive high beam or as a lens of an objective for adaptive high beam. Examples of adaptive high beams can be found at web.archive.org/web/20150109234745/http://www.audi.de/content/de/brand/de/vorsprung_durch_technik/content/2013/08/Audi-A8-erstrahlt-in-neuem-Licht.html (accessed Sep. 5, 2019), www.all-electronics.de/matrix-led-und-laserlicht-bietet-viele-vorteile/ (accessed Sep. 2, 2019), and www.next-mobility.news/led-im-fahrzeug-die-rolle-der-matrixscheinwerferund-was-sie-leisten-a-756004/ (accessed Sep. 2, 2019).

The present disclosure concerns further a method for manufacturing a vehicle headlight, wherein the primary optic comprises a system of movable micromirrors, for example a system of more than 100,000 movable micromirrors, for example a system of more than 1,000,000 movable micromirrors, for generating the illumination pattern The present disclosure concerns further a method for manufacturing an objective, wherein at least a first lens is produced according to a method having one or more of the aforementioned features and is subsequently installed in an objective and/or an objective housing. In an illustrative embodiment, at least a second lens is produced according to a method having one or more of the aforementioned features and is subsequently installed in an objective and/or an objective housing. In an illustrative embodiment, at least a third lens is produced according to a process having one or more of the aforementioned features and is subsequently installed in an objective and/or an objective housing. In an illustrative embodiment, at least a fourth lens is produced according to a method having one or more of the aforementioned features and is subsequently installed in an objective and/or an objective housing. The aforementioned task is further solved by a method for manufacturing a camera, wherein a lens produced according to a method having one or more of the aforementioned features is installed together with a sensor or light-sensitive sensor in such a way that an object can be imaged onto the sensor by means of the lens. The aforementioned objective and/or the aforementioned camera can be used as a sensor system or environment sensor system for use in vehicle headlights, such as the aforementioned vehicle headlights, and/or in driving assistance systems. The method can also be used to manufacture lenses for finger scanners, such as described in German patent application DE 10 2019 126 419.7.

In an illustrative embodiment, it is provided that the maximum deviation of the actual value from the desired value of the distance between two optically active surfaces of the optical element is not greater than 40 μm, for example not greater than 30 μm, for example not greater than 20 μm, for example not less than 2 μm. In an illustrative embodiment, it is provided that the maximum deviation of the actual value from the desired value of the distance between an optically active surface and a plane orthogonal to the optical axis of the optically active surface, this plane comprising the geometric center of gravity of the optical element, is not greater than 20 μm, for example not greater than 15 μm, for example not greater than 8 μm, for example not less than 1 μm. In an illustrative embodiment, it is provided that the value RMSt (total surface shape deviation) according to DIN ISO 10110-5 of April 2016 for the optically active surfaces of the optical element, for at least one optically active surface of the optical element and/or for at least two optically active surfaces of the optical element, is not greater than 12 μm, for example is not greater than 10 μm, for example is not greater than 8 μm, for example is not greater than 6 μm, for example is not greater than 4 μm, for example is not greater than 2 μm, for example is not smaller than 0.5 μm.

The present disclosure concerns further a method for manufacturing an optical element, for example a lens, for example a hybrid headlight lens, for example for vehicle headlights, for example a lens having one or more of the aforementioned features, respectively a method for producing an optical element according to one or more of the aforementioned features, wherein a partial-optic with an (optically effective) planar or essentially planar coating surface of a first transparent optical material is provided and/or produced, wherein a mold with a cavity is provided and/or produced, wherein liquid transparent second optical material is added to the cavity of the mold and/or on the partial-optic, wherein the partial-optic with the coating surface is pressed in the cavity of the mold, e.g., under vacuum or under negative pressure, such that an (optically effective) planar coating is formed or can be formed (e.g. by means of further process steps), for example on the planar or essentially planar coating surface. Such an optical component has, for example, a convexly curved, for example aspherical, surface on the side opposite the planar surface.

Motor vehicle in the sense of the present disclosure is for example a land vehicle which can be used individually in road traffic. Motor vehicles within the meaning of the present disclosure are for example not limited to land vehicles with internal combustion engines.

Figure 8:
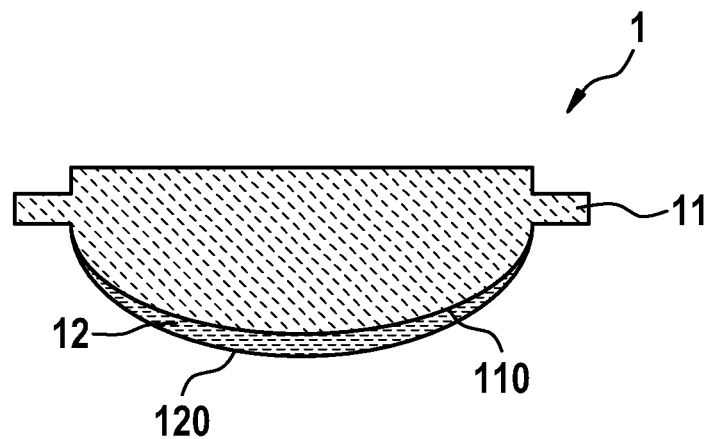
FIG. 8 shows an embodiment of a hybrid lens.

FIG. 1 describes a method for producing an optical element 1 designed as a hybrid headlight lens according to FIG. 8. The optical element 1 designed as a hybrid headlight lens according to FIG. 8 comprises a partial-optic 11 made of a first lens material, for example glass such as DOCTAN. The partial-optic 11 comprises, inter alia, a convexly curved, for example press molded, surface 110 on which a coating 12 of a second optical material is arranged, the coating 12 having an optically effective convexly curved surface designated by reference numeral 120, which may comprise, for example, light-diffracting structures. For example, a surface is optically effective within the meaning of the present disclosure if it alters the direction of light passing through the surface during intended use with respect to its direction and/or its beam or bundle characteristics. A surface, such as an edge, through which no light is intended to pass is for example not optically effective within the meaning of the present disclosure.

Figure 2:
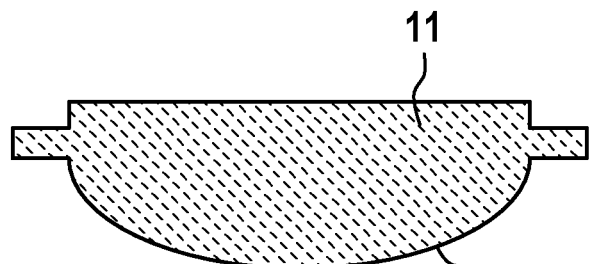
FIG. 2 shows an example of a partial-optic system.

The method for producing an optical element 1 in the form of a hybrid headlight lens according to FIG. 1 comprises a step 41 in which a partial-optic 11 according to FIG. 2 with a convexly curved, for example press molded, surface 110 is manufactured or provided. Suitable methods for manufacturing such a partial-optic 11 are disclosed in WO 2019/072325 A1, German patent application 10 2019 119 042.8 and/or German patent application 10 2020 115 078.4.

Figure 3:
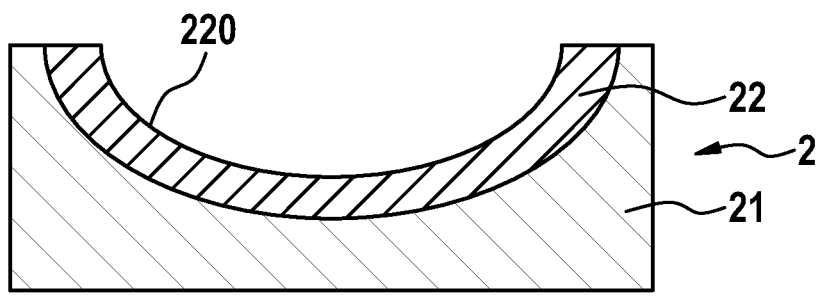
FIG. 3 shows an embodiment of a mold for forming a coating for a hybrid lens.
Figure 4:
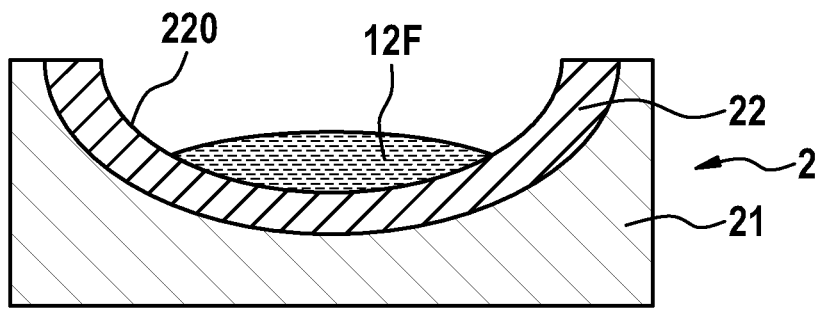
FIG. 4 shows an embodiment of a mold according to FIG. 3 filled with a transparent ink.

The method of producing the optical element 1 configured as a hybrid headlight lens further comprises a step 42 in which a mold 2 as shown in FIG. 3 is provided or manufactured. In one embodiment, the mold 2 as shown in FIG. 3 and FIG. 4 comprises a support mold 21 and an impression mold 22 having an impression surface 220 having the negative of the convexly curved optically effective surface 120 of the coating 12 as shown in FIG. 8. The support mold 21 may be made of metal, for example. However, it may also be made of transparent material such as acrylic or a photopolymer, a photopolymer AR-M2, an acrylate. In an exemplary embodiment, the impression mold 22 is or is made of silicone rubber. Silicones are (for example) polymeric silicon compounds made from pure quartz sand. The three-dimensional structural framework consists of a main chain of alternating silicon-oxygen bonds. The remaining free valence bonds on the silicon atom are occupied by organic groups. Numerous possibilities regarding the type and number as well as the mutual linkage of the organic groups create a wide scope for changing the properties of the silicones. Preferably, methyl groups link up with the still free bonds of the silicon atoms. Silicones are for example polydimethylsiloxanes (PDMS).

The starting point in the production of silicones is the direct synthesis of silanes from elementary silicon. The silanes then react via hydrolysis and polycondensation, comparable to polymer synthesis, to form long polysiloxane chains. In subsequent process steps, the polysiloxanes are processed into silicone oils, resins or rubbers. In connection with this disclosure, the term "polysiloxane" is to be equated with the term "silicone". To produce silicone rubber, the polysiloxane chains form the base material. Crosslinking of the long-chain structures to form a solid elastomeric material is accomplished via vulcanization and the associated addition of additives. One possible chemical crosslinking principle is addition crosslinking. In this process, introduced silicon-hydrogen groups react with the double bonds of the organic groups of the silicon-oxygen framework and cause crosslinking to form an elastomeric material. Platinum catalysts can also increase crosslinking at room temperature.

Silicone rubber exhibits good thermal resistance and little change in physical properties over a wide temperature range from −50° C. to +250° C. Due to the strongly pronounced release effect, adhesion of the InkOrmo hybrid polymer to the mold can be avoided. The methyl groups, which form a barrier between the polymer and the mold, are responsible for the hydrophobic effect. The silicone rubber used as an example is ESSIL 291 from the company Sika Germany. The two-component silicone rubber is produced with a mixing ratio of ten parts base material and one part catalyst. Curing takes place at room temperature for 16 h. The transparent material exhibits a slight shrinkage of <0.1% to the initial volume.

In the method of manufacturing the optical element 1 formed as a hybrid headlight lens, liquid transparent material 12F for the optically effective coating 12 is provided or mixed in a step 43. The liquid transparent material 12F comprises or is a polymer hybrid such as Ormocer (as a mixture of a second optical material and a solvent). To this end, for example, solvent is mixed with the second optical material at a predetermined concentration. In this way, i.e. by the appropriate amount of solvent, the desired viscosity is adjusted.

ORMOCER® is an inorganic-organic hybrid polymer developed by the Fraunhofer Institute for Silicate Research. Due to the linking of inorganic networks with organic structural groups, the material properties can be varied almost freely and specific application parameters can be set. The hybrid polymer contains basic structural elements from glass and ceramics as well as organic polymers and silicones.

The polymer synthesis is based on a modified sol-gel process in which ORMOCER® is produced via a polycondensation and subsequent organic crosslinking reaction. For this purpose, inorganic network structures are generated from silicon alkoxides via controlled hydrolysis and condensation. By adding organic polymer groups, a base resin is formed into which an additive of functional side groups and photoinitiators is incorporated. Crosslinking of the individual structures to form a stable three-dimensional polymer network is finally achieved by UV treatment.

The high transparency, hardness, chemical and thermal stability determine the glassy network groups. Due to the strong connection with the organic networks, the regulation of toughness, functionality and processability is possible. With the integration of special types of functional groups, interfacial properties, elasticity, or gas permeability can be tuned for the intended applications (see: www.barrier.fraunhofer.com/de/forschung-und-entwicklung/-ormocer-e-_-die-kreative-materialbasis.html (accessed Oct. 8, 2019)).

A hybrid polymer based on ORMOCER® is InkOrmo, which is marketed by the company micro-resist-technology. The ready-to-use material is usually processed by inkjet printing.

Solvents in this UV-curable polymer lower the viscosity and thus create better processability. The standard solution of InkOrmos has a viscosity of 18 mPas at 25° C. The solvent content is 54%. The solvent content is 54%. The photoinitiators have a spectral sensitivity between 300 nm and 410 nm and, when exposed to an adequate wavelength, react by polymerization to form a solid thermoset material. The shrinkage of InkOrmo after curing is 5% to 7% of the initial volume. In addition, at $60.10^{-6}$ 1/K, the polymer exhibits nearly six times the thermal expansion of mineral glasses. The glass-like material has a refractive index of 1.5200 at a wavelength of 589.29 nm and an Abbe number of 47.00. The course of the refractive index can be significantly influenced by an additional heat treatment after curing, the so-called hardbake. Electromagnetic radiation with wavelengths in the ultraviolet range and the visible range (VIS) transmit through the InkOrmo at approximately full intensity.

Figure 5:
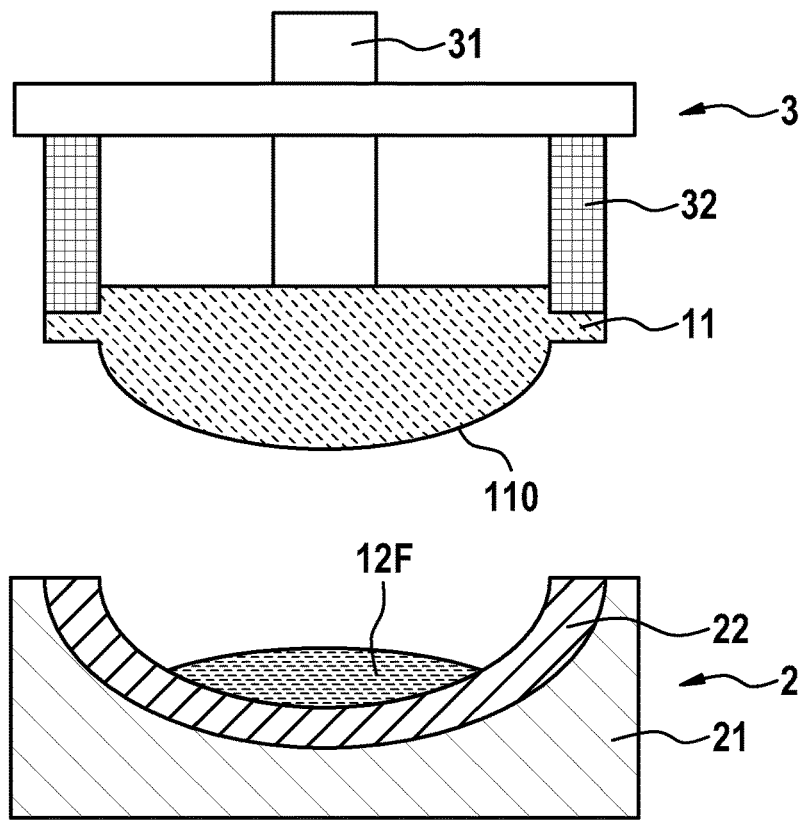
FIG. 5 shows a handling device or handling arrangement for moving and pressing a partial-optic.

This is followed by a step 44 in which the transparent material 12F is placed in the mold 2, as shown in FIG. 4. The step 44 is followed by a step 45 in which the partial-optic 11 is fed to the mold 2—as shown in FIG. 5—by means of a handling arrangement 3. The handling arrangement 3 comprises a suction arrangement 31 for transporting the lens 11 and a pressing arrangement 32.

Figure 6:
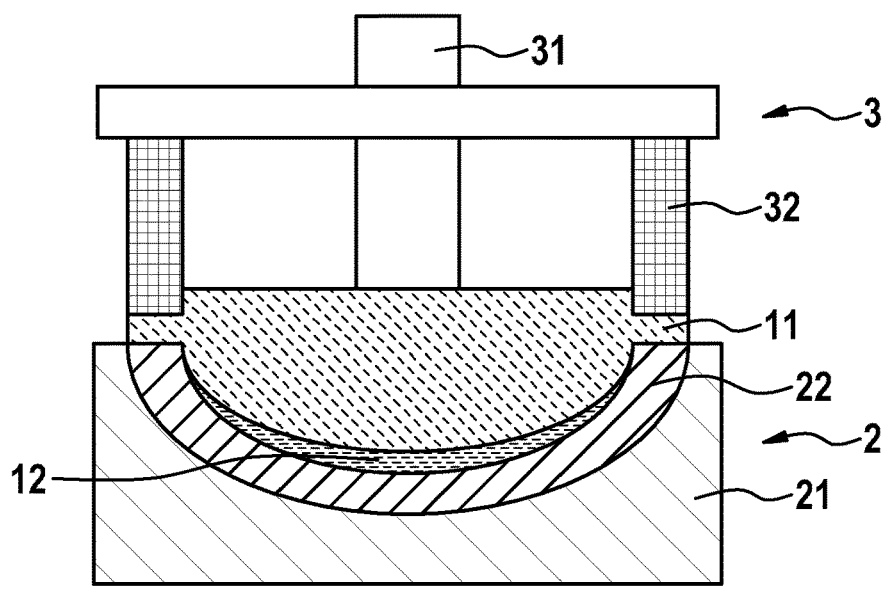
FIG. 6 shows an embodiment of pressing a coating onto a partial-optic according to FIG. 5.
Figure 7A:
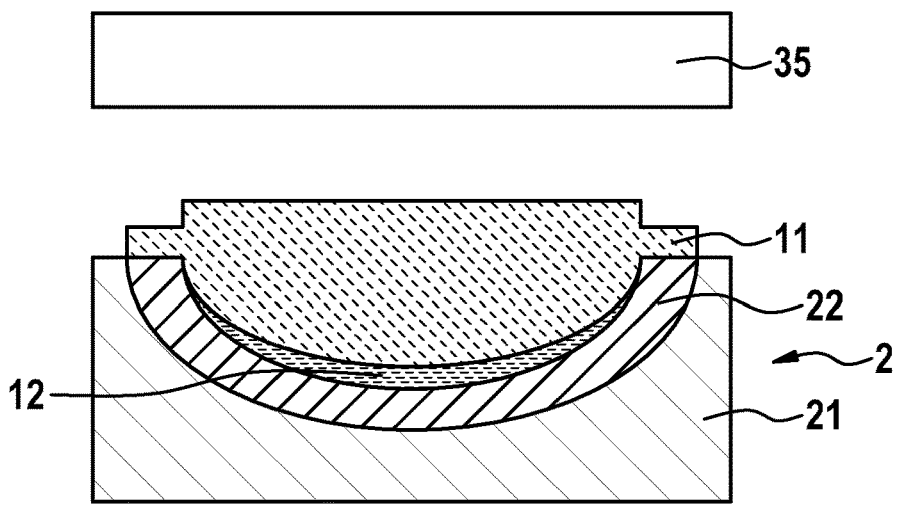
FIG. 7A shows an example of an embodiment of UV curing of a coating.
Figure 7B:
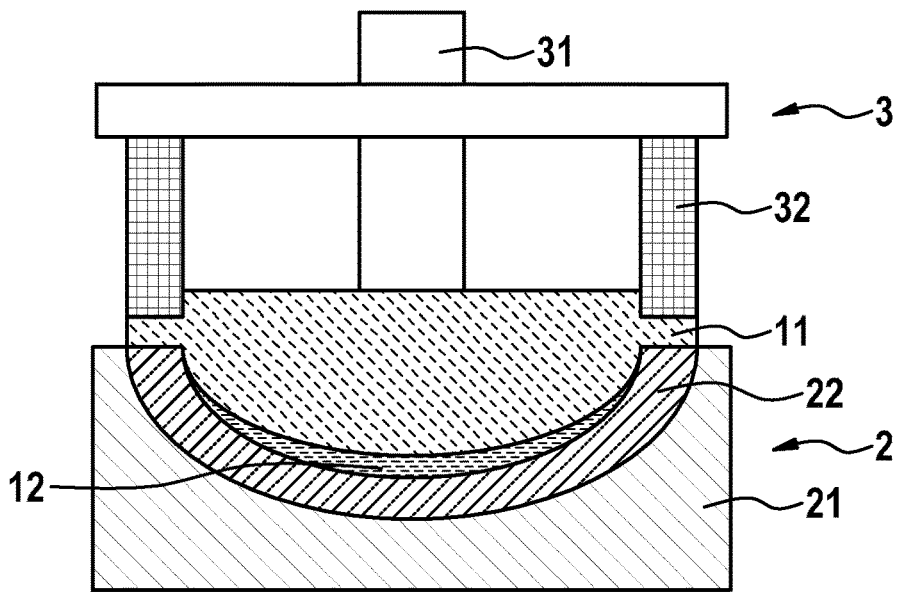
FIG. 7B shows an alternative embodiment of UV curing of a coating according to FIG. 6.
Figure 7B:
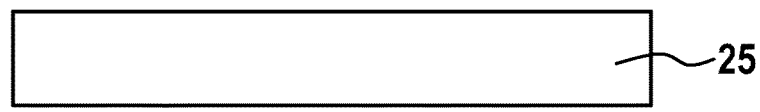

The step 45 is followed by a step 46 in which the partial-optic 11—as shown in FIG. 6—is pressed into the mold 2 by means of the pressing arrangement 32. The step 46 is followed by a step 47 in which the solvent in the transparent material of the coating 12 is (at least partially) evaporated so that its viscosity increases. For curing, the transparent material of the coating 12 is exposed to UV light (and thereby cured) in a step 48. This can be done, for example as shown in FIG. 7A, by means of a UV light source 35 arranged above the partial-optic element 11 or the optical element 1 formed as a hybrid headlight lens, so that the UV light is incident on the coating 12 through the partial-optic 11. In an alternative embodiment, it may be provided that the carrier mold 21 and the impression mold 22 are transparent, so that UV light—as shown in FIG. 7B—impinges on the coating 12 by means of a UV light source 25 arranged below the mold 2. It may also be provided that UV light sources are arranged at the side of the mold 2. It may also be provided that one or more of the UV light sources 25 or 35 or UV light sources are arranged laterally of the mold 2. The UV light sources are, for example, LED area lamps, for example for generating a uniform light intensity. In the present example, the emitting wavelength of 365 nm is matched to the spectral sensitivity of the InkOrmo.

Subsequently, in a step 49, the finished optical element designed as a hybrid headlight lens, as shown in FIG. 8, is removed. This can be done again by means of the suction device 31.

Figure 9:
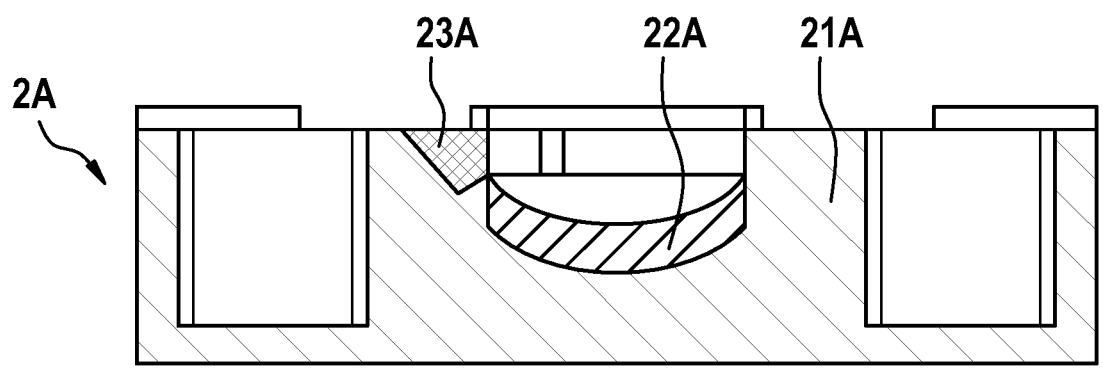
FIG. 9 shows a cross-sectional view of a mold shown in FIG. 10.
Figure 10:
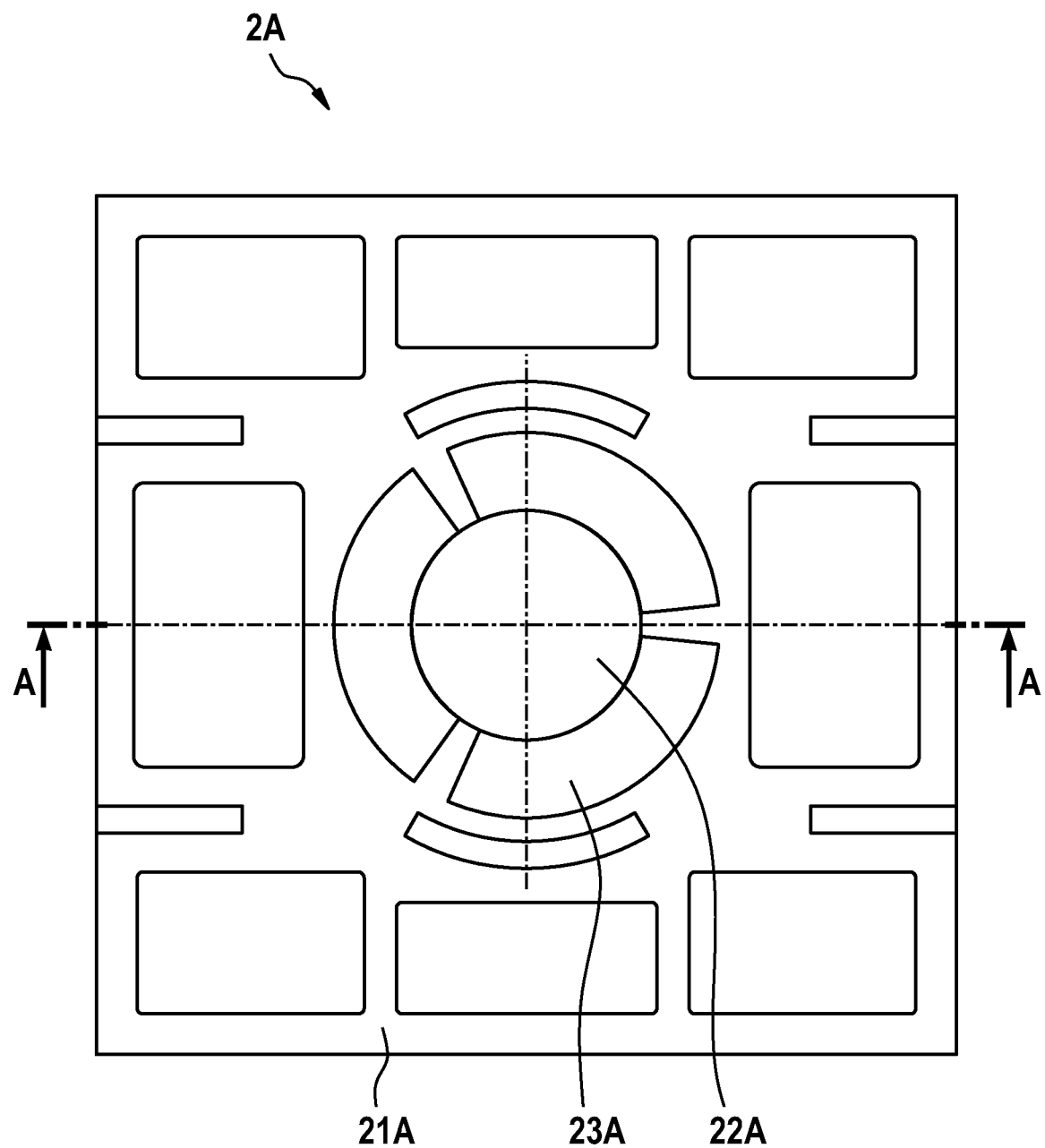
FIG. 10 shows another embodiment of a mold for forming a hybrid lens.

FIG. 9 shows an alternative embodiment of a mold 2A, namely in a cross-sectional view along the section line marked AA from FIG. 10. There reference sign 21A denotes the carrier mold and reference sign 22A denotes the impression mold. Reference numeral 23A denotes the circle segments.

Figure 11:
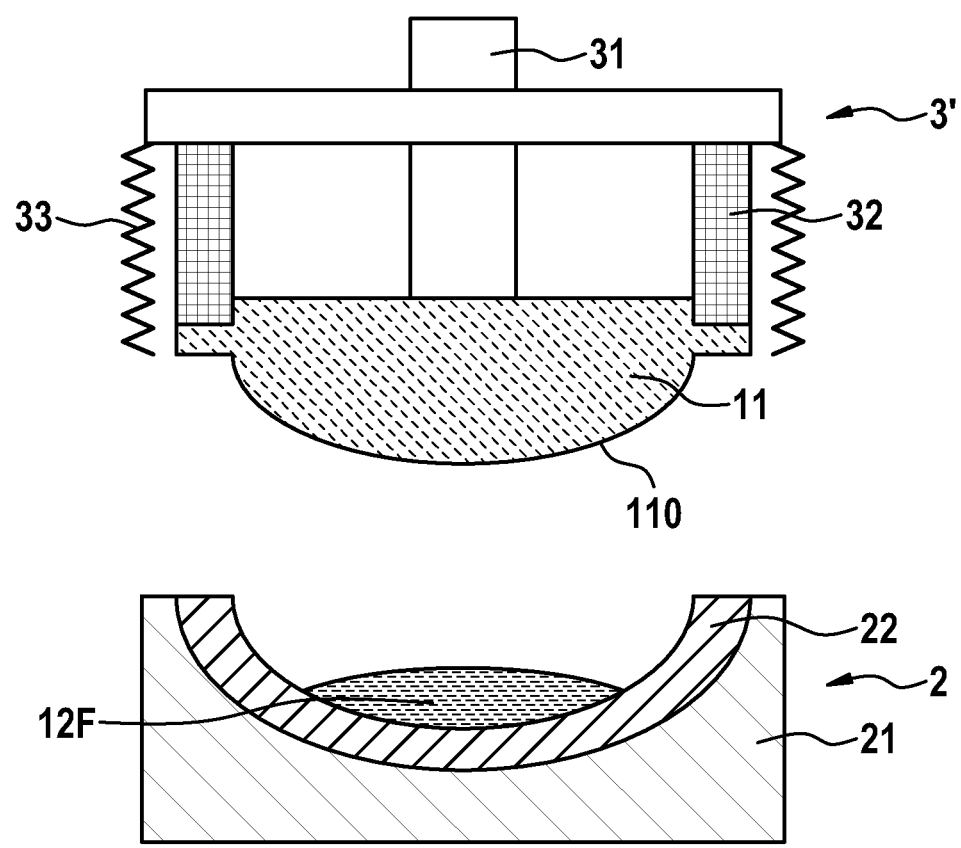
FIG. 11 shows another embodiment of pressing a coating onto a partial-optic according to FIG. 5.

The described process can also be carried out in conjunction with forming the coating 12 under vacuum or near-vacuum or at least negative pressure. Suitable processes are disclosed, for example, in JP 2003-048728 A and in WO 2014/131426 A1. In a corresponding embodiment, it is provided that the handling arrangement 3 comprising the suction arrangement 31 as well as the pressing arrangement 32 (hereinafter referred to as modified handling arrangement 3') is supplemented by a bellows 33, as disclosed in WO 2014/131426 A1 at least in a similar manner (cf. for example FIG. 11). In this embodiment, step 44, in which the transparent material 12F is placed in the mold 2 as shown in FIG. 4, is followed by a modified step 45, in which the partial-optic 11 are fed to the mold 2—as shown in FIG. 11—by means of a modified handling arrangement 3'.

Figure 12:
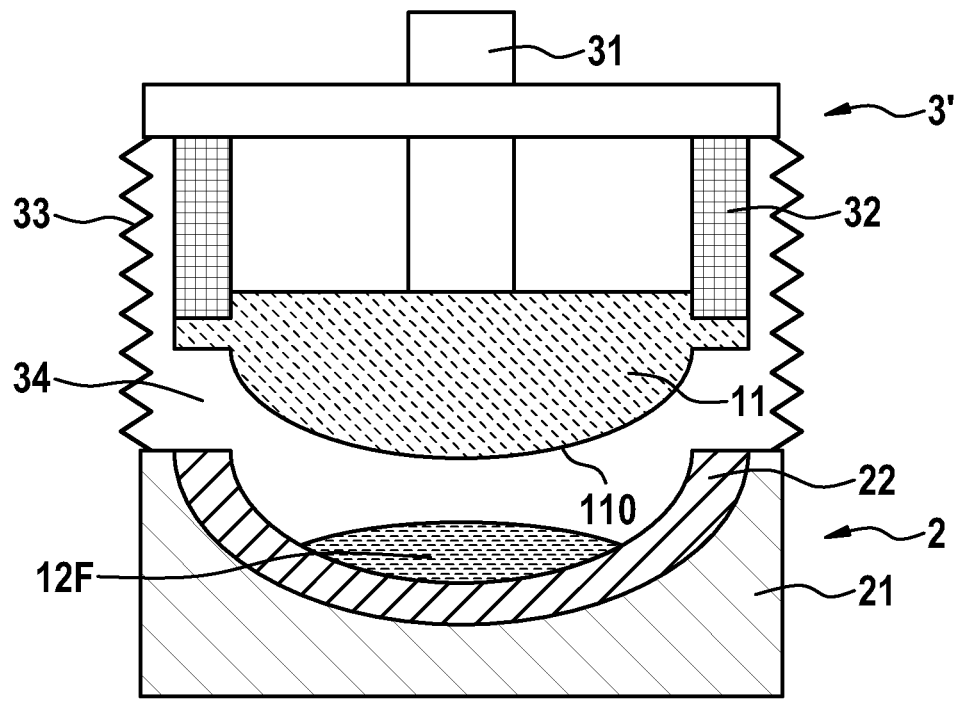
FIG. 12 shows the procedure according to FIG. 11 at a later point in time.
Figure 13:
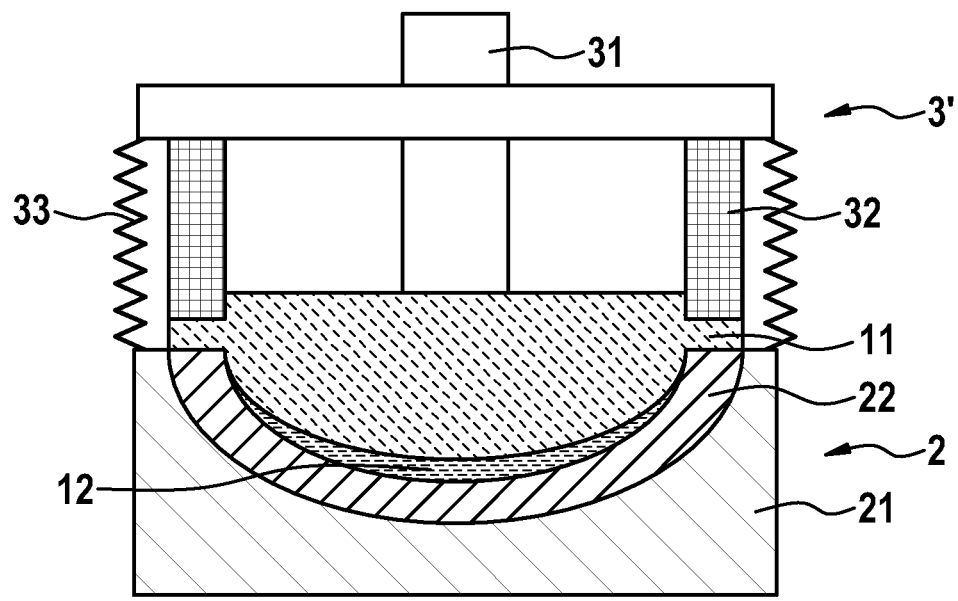
FIG. 13 shows the procedure according to FIG. 11 at a later point in time.

Step 45 is followed by a modified step 46, in which the partial-optic 11—as shown in FIG. 13—is pressed into the mold 2 by means of the pressing arrangement 32. In this process, however, the bellows 33 is first moved, for example when the mold 2 and the partial-optic 11 are "moved towards each other" by means of the handling arrangement 3', in such a way that—as shown in FIG. 12—an at least substantially airtight space 34 is formed. As soon as the space 34 is closed, a negative pressure or vacuum is generated in it. In the process, the mold 2 and the handling arrangement 3' are moved further towards each other. The described process is suitable for forming a coating with small structures, for example with diffractive structures, around the center of the optically effective area, for example around the center of the surface 110. The modified step 46 is followed by step 47, in which the solvent in the transparent material of the coating 12 is (at least partially) evaporated so that its viscosity increases. For curing, the transparent material of the coating 12 is exposed to UV light (and thereby cured) in the step 48.

Figure 14:
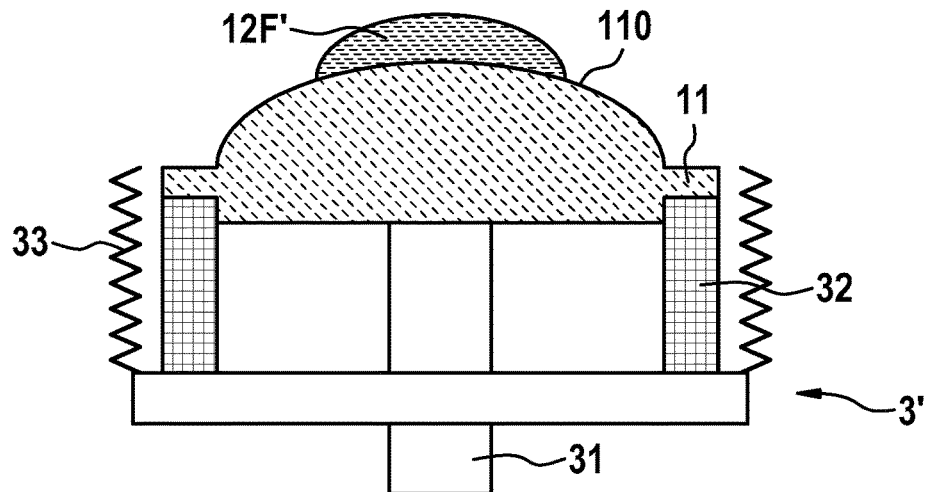
FIG. 14 shows another embodiment of pressing a coating onto a partial-optic.
Figure 15:
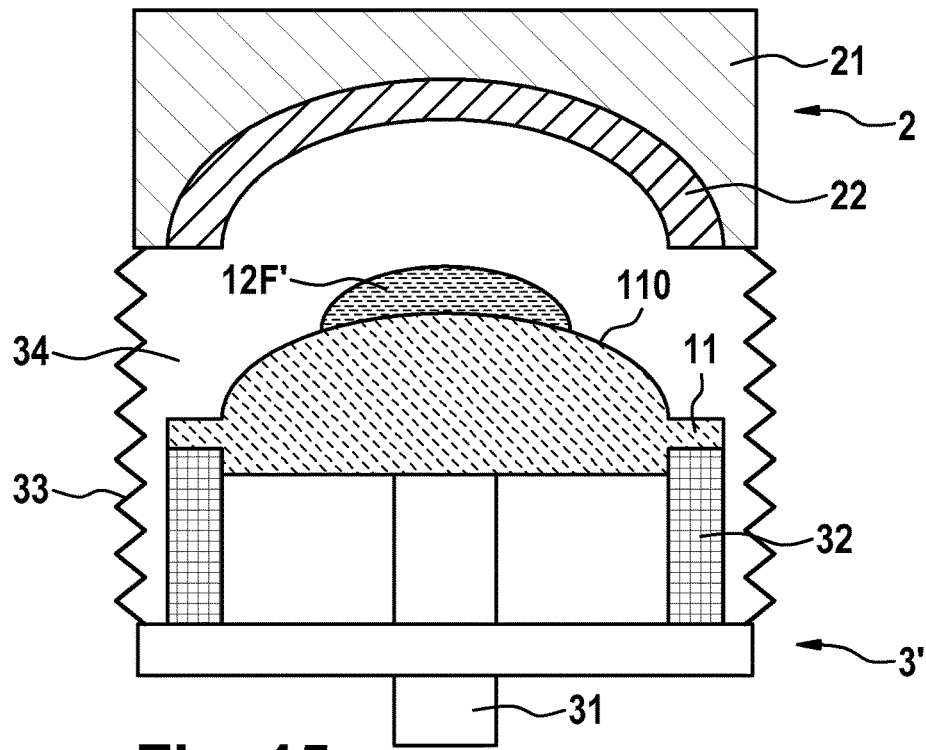
FIG. 15 shows the procedure according to FIG. 14 at a later point in time.

In a further alternative process—as shown in FIG. 14—transparent material 12F' is applied to the surface 110 of the partial-optic 11. In an illustrative embodiment, the transparent material 12F' has a higher viscosity than the material 12F. Furthermore, the partial-optic 11 is fed to the mold 2 by means of a handling arrangement 3' corresponding to the handling arrangement 3. This is followed by a step in which the handling arrangement 3' with the partial-optic 11 and the mold 2 are moved towards each other. In this process, the bellows 33 is moved in such a way that—as shown in FIG. 15—a closed, at least substantially airtight space 34 is created in which a negative pressure or vacuum is generated. The mold 2 and the handling arrangement 3' are moved further towards each other so that the partial-optic 11—as shown in FIG. 16—is pressed into the mold 2 by means of the pressing arrangement 32.

This step 46 is followed by step 47, in which the solvent in the transparent material of the coating 12 is (at least partially) evaporated so that its viscosity increases. For curing, the transparent material of the coating 12 is exposed to UV light (and thereby cured) in a step 48.

Figure 17:
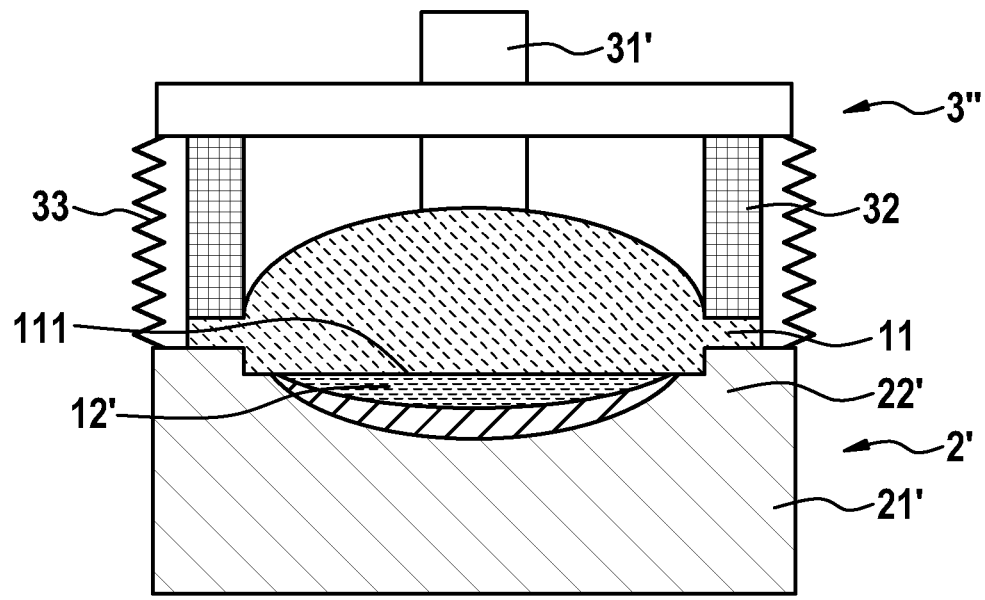
FIG. 17 shows a method for coating a planar surface of a plan-convex partial-optic in analogy to the method according to FIG. 13.

FIG. 17 also shows a method, corresponding with reference to FIG. 11, FIG. 12 and FIG. 13, for coating the planar surface of the partial-optic 11 designated by reference 111.

Figure 16:
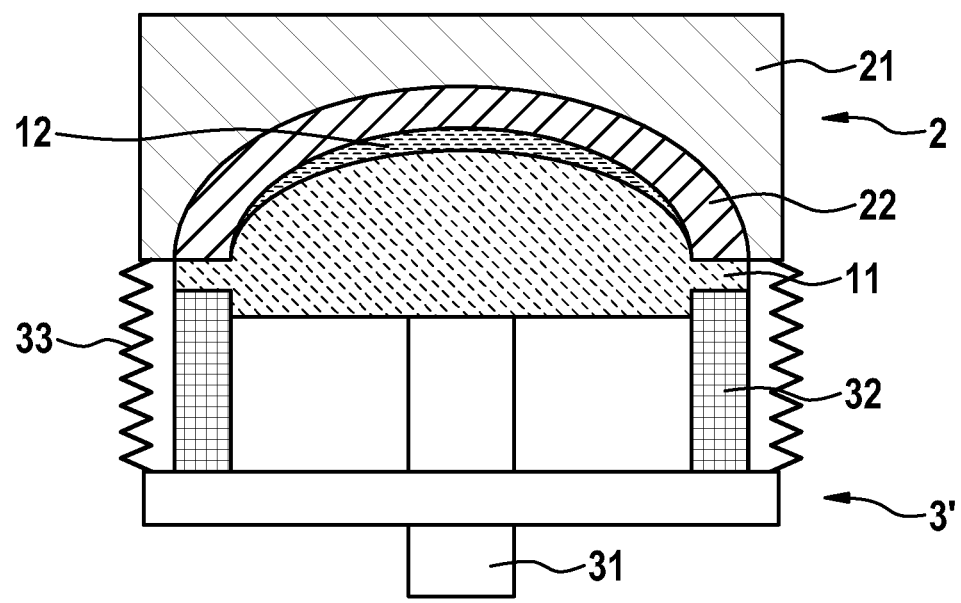
FIG. 16 shows the procedure according to FIG. 14 at a later point in time.
Figure 18:
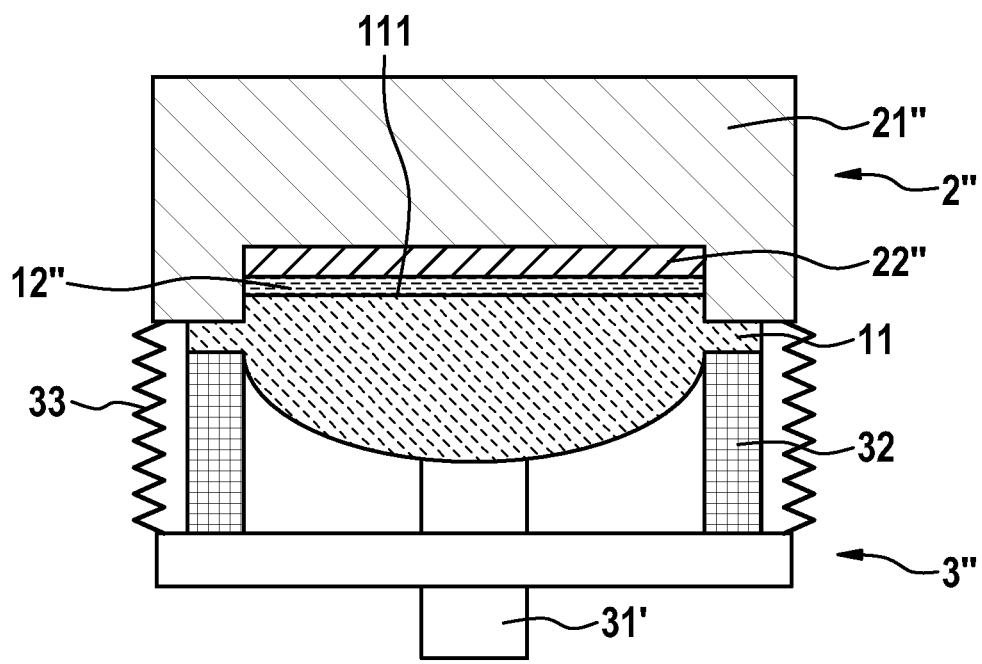
FIG. 18 shows a method for coating a planar surface of a plan-convex partial-optic in analogy to the method according to FIG. 16.

FIG. 18 shows a method, moreover, with reference to FIG. 14, FIG. 15 and FIG. 16, for coating the planar surface of the partial-optic 11 designated by reference numeral 111.

In FIG. 17 and FIG. 18, molds 2' and 2" replace mold 2, carrier molds 21' and 21" replace carrier mold 21, impression molds 22' and 22" replace impression mold 22, furthermore, handling arrangement 3" replaces handling arrangements 3 and 3', respectively, and suction arrangement 31' replaces suction arrangement 31. Reference signs 12' and reference signs 12" denote (optically effective) coatings corresponding to coating 12 and coatings made of corresponding material to coating 12, respectively.

The process described is suitable for generating diffractive structures on the surface of the coating 12, for example also for generating diffractive structures in the center of the optically effective surface, such as the convex surface 110 of the partial-optic 11.

Figure 19:
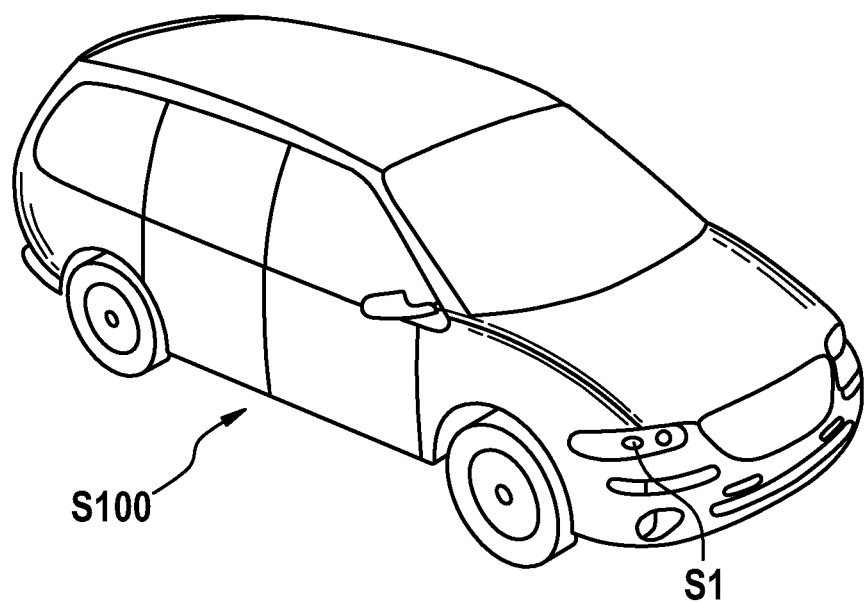
FIG. 19 shows an example of an embodiment for a motor vehicle.
Figure 20:
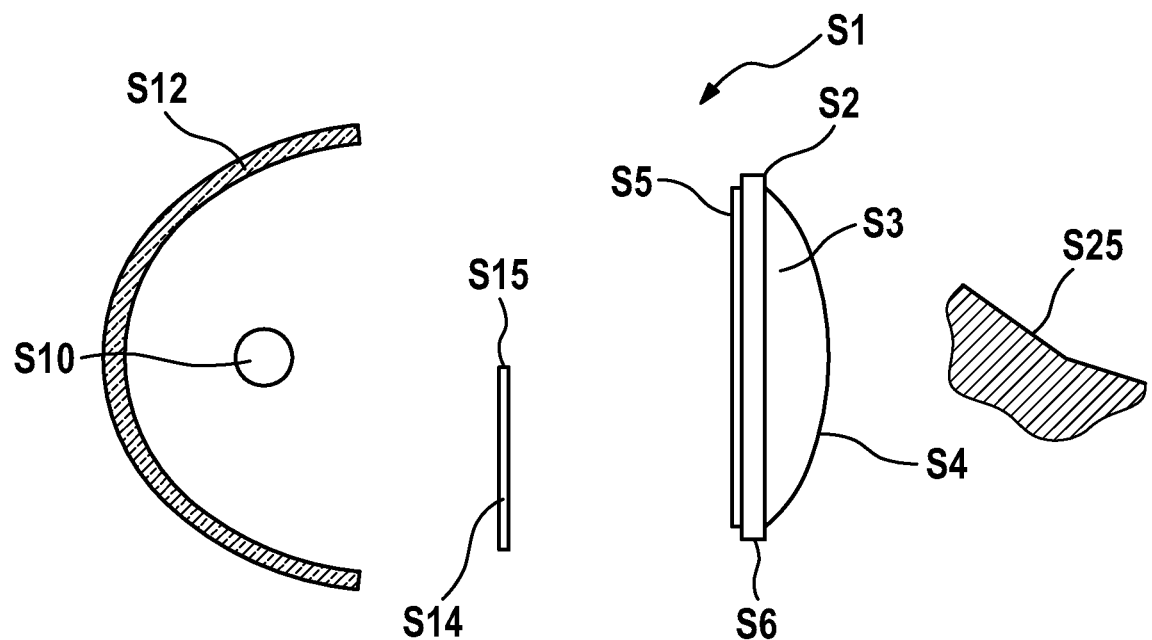
FIG. 20 shows an embodiment of a projection headlight for a motor vehicle according to FIG. 19 using a hybrid lens based on the hybrid lens according to FIG. 8.
Figure 21:
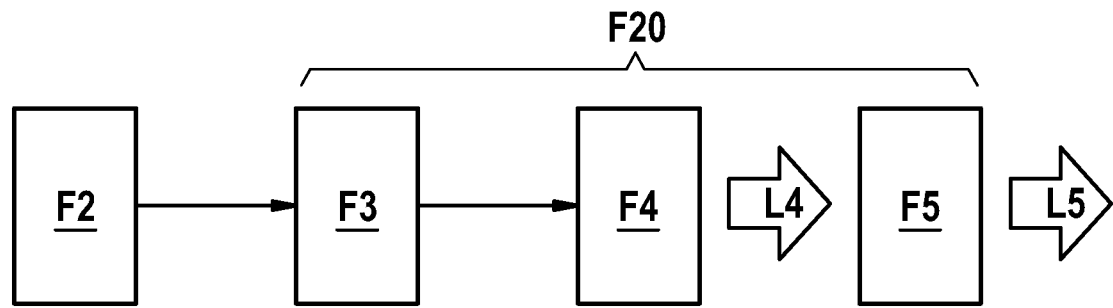
FIG. 21 shows an embodiment of an alternative motor vehicle headlight for use in the motor vehicle shown in FIG. 19.

FIG. 19 shows a motor vehicle S100 with a vehicle headlight S1—shown schematically in FIG. 21—having a light source S10 for generating light, a reflector S12 for reflecting light which can be generated by means of the light source S10, and a shield S14. The vehicle headlight S1 also comprises a hybrid headlight lens S2 for imaging an edge of shield S14, designated by reference sign S15 in FIG. 21, as a bright-dark-boundary S25.

The hybrid headlight lens S2 corresponds in principle to the optical element 1 designed as a hybrid headlight lens and comprises a lens body S3, a substantially planar (optically effective) surface S5 facing the light source S10 and a convexly curved optically effective surface S4 facing away from the light source S10, which surface S4 corresponds to the surface 12 of the optical element 1 designed as a hybrid headlight lens. The hybrid headlight lens S2 further comprises an integrally formed lens edge S6, by means of which the headlight lens S2 can be fixed in the vehicle headlight S1.

A headlight lens corresponding to the optical element 1 designed as a hybrid headlight lens or a lens corresponding to the hybrid headlight lens S2 can be used, for example, in matrix lighting as a secondary optical system for imaging a light exit side of an attachment optics. In this case, for example, the shield S14, the light source S10 and the reflector S12—as described below—are replaced by an attachment optics into which light is fed by means of an array of light sources and which generates a specific light distribution that is imaged at its light exit surface by the corresponding polymer hybrid lens. For example, a light-diffracting structure is provided on the surface S4 or 120 for chromatic correction, whereby unwanted color fringing is suppressed.

Figure 22:
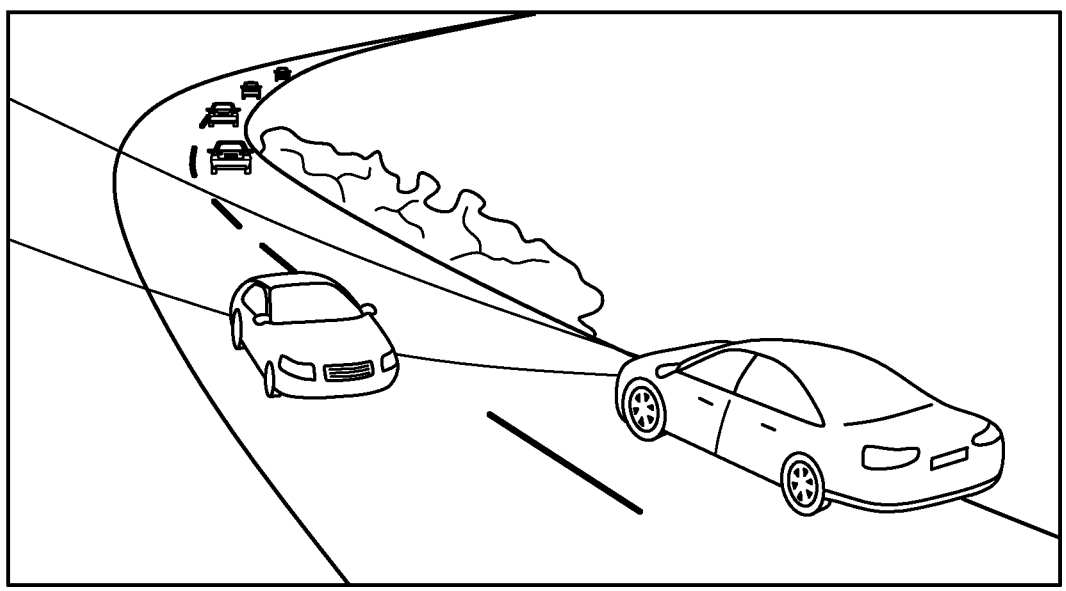
FIG. 22 shows an embodiment example for matrix light or adaptive high beam.
Figure 23:
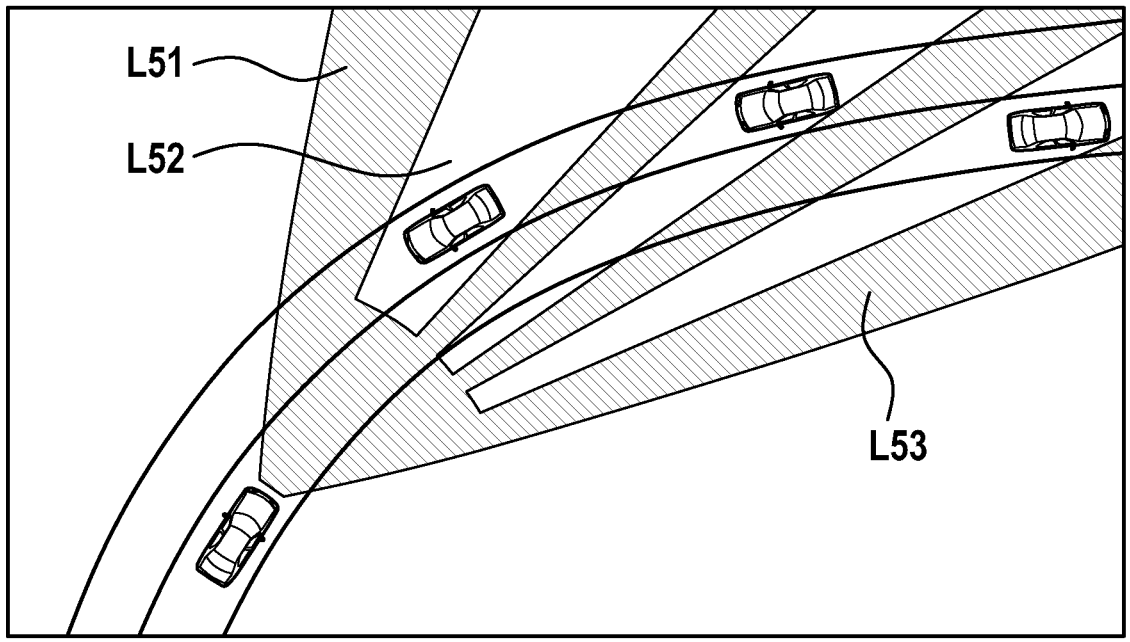
FIG. 23 shows another embodiment example for matrix light or adaptive high beam.

FIG. 21 shows an adaptive headlight or vehicle headlight F20—which can be used instead of the vehicle headlight S1—for situation- or traffic-dependent illumination of the surroundings or the road ahead of the motor vehicle S100 as a function of environment sensors F2 of the motor vehicle S100. For this purpose, the vehicle headlight F20 shown schematically in FIG. 21 has an illumination device F4 which is controlled by means of a controller F3 of the vehicle headlight F20. Light L4 generated by the illumination device F4 is emitted as an illumination pattern L5 from the vehicle headlight F20 onto the area in front of the motor vehicle S100 by means of an objective F5, which may comprise one or more optical elements or headlight lenses produced according to the aforementioned method. Examples of corresponding illumination patterns are shown in FIG. 22 and FIG. 23, as well as the websites web.archive.org/web/20150109234745/http://www.audi.de/content/de/brand/de/vorsprung_durch_technik/content/2013/08/Audi-A8-erstrahlt-in-neuem-Licht.html (accessed Sep. 5, 2019) and www.all-electronics.de/matrix-led-und-laserlicht-bietet-viele-vorteile/ (accessed Sep. 2, 2019). In the embodiment shown in FIG. 23, the illumination pattern L5 includes dazzled areas L51, dimmed areas L52, and cornering lights L53.

Figure 24:
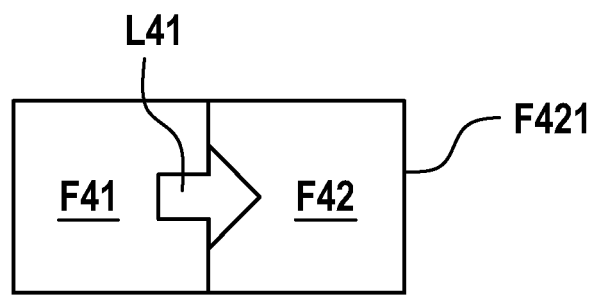
FIG. 24 shows an example of an illumination device of a vehicle headlight according to FIG. 21.

FIG. 24 shows an embodiment example for the illumination device F4, wherein this comprises a light source arrangement F41 with a plurality of individually adjustable areas or pixels. For example, up to 100 pixels, up to 1000 pixels, or not less than 1000 pixels may be provided, which in the sense are individually controllable by means of the controller F3 such that they can be individually switched on or off, for example. It may be provided that the illumination device F4 further comprises an attachment optics F42 for generating an illumination pattern (such as L4) at the light emitting surface F421 in accordance with the correspondingly controlled areas or pixels of the light source arrangement F41 or in accordance with the light L41 irradiated into the attachment optics F42.

Matrix headlights within the meaning of the present disclosure may also be matrix SSL HD headlights. Examples of such headlights are shown in the Internet link www.springerprofessional.de/fahrzeug-lichttechnik/ fahrzeugsicherheit/hella-bringt-neues-ssl-hd-matrix-licht-system-auf-den-markt/17182758 (accessed May 28, 2020), the Internet link www.highlight-web.de/5874/hella-ssl-hd/ (accessed May 28, 2020), and the Internet link www.hella.com/techworld/de/Lounge/Unser-Digital-Light-SSL-HD-Lichtsystem-ein-neuer-Meilenstein-der-automobilen-Lichttechnik-55548/ (accessed May 28, 2020).

Figure 25:
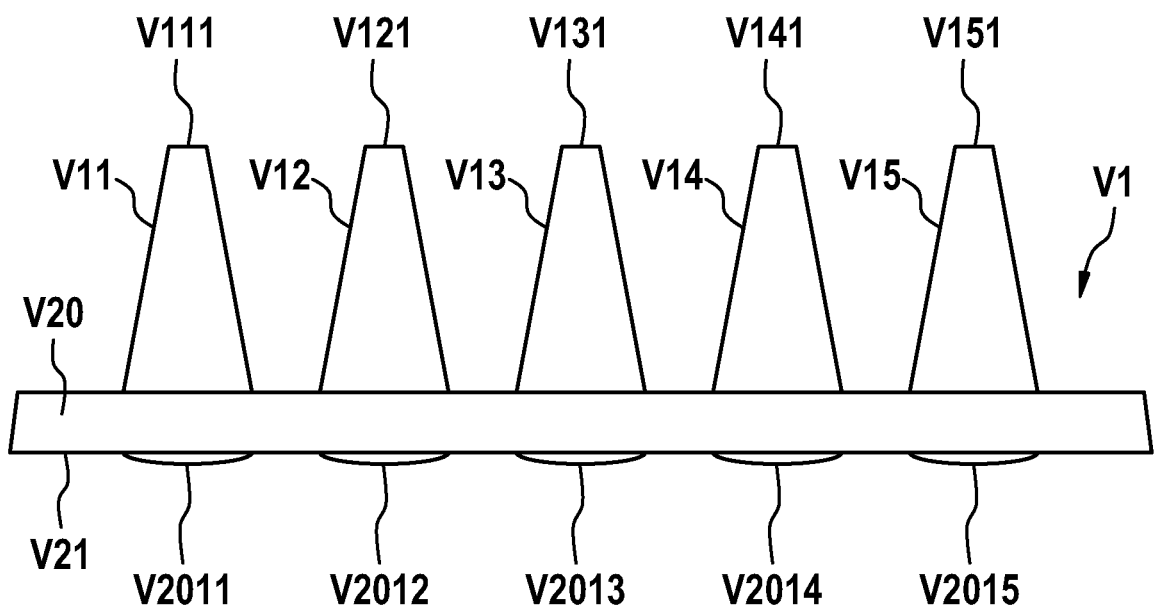
FIG. 25 shows an embodiment of an attachment optics array in a side view.
Figure 26:
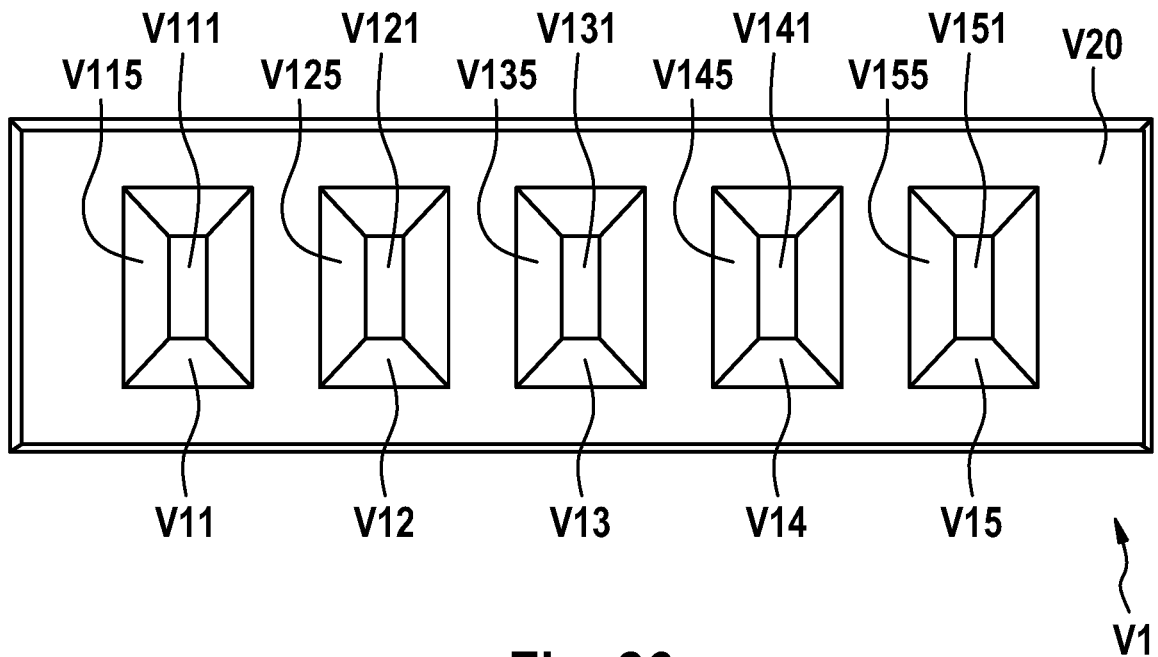
FIG. 26 shows the attachment optics array shown in FIG. 25 in a top view and, FIG. 27 shows the use of an attachment opticsal array according to FIG. 25 and FIG. 26 in a motor vehicle headlight usable in a motor vehicle according to FIG. 19.

FIG. 25 shows a one-piece attachment opticsal array V1 in a side view. FIG. 26 shows the attachment opticsal array V1 in a top view from behind. The attachment opticsal array V1 includes a base member V20 having lenses V2011, V2012, V2013, V2014, and V2015 attached thereto and an attachment optics V11 having a light entering surface V111, an attachment optics V12 having a light entering surface V121, an attachment optics V13 having a light entering surface V131, an attachment optics V14 having a light entering surface V141, and an attachment optics V15 having a light entering surface V151 are formed. The side surfaces V115, V125, V135, V145, V155 of the attachment optics V11, V12, V13, V14, V15 are configured in such a way that light entering the respective light entry surface V111, V121, V131, V141 or V151, respectively, is subject to total internal reflection (TIR) so that this light—emerges from the base part V20 or the surface V21 of the base part V20, respectively, which forms the common light exit surface of the attachment optics V11, V12, V13, V14 and V15. The rounding radii between the light entry surfaces V111, V121, V131, V141 and V151 at the transition to the side surfaces V115, V125, V135, V145 and V155 are, for example, 0.16 to 0.2 mm.

Figure 27:
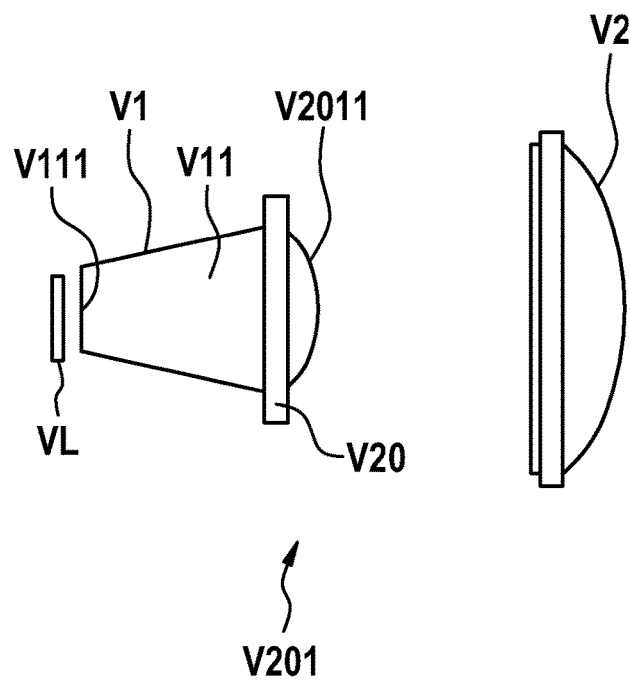

FIG. 27 shows a vehicle headlight V201 or motor vehicle headlight—which can be used instead of the vehicle headlight S1—in a principle illustration. The vehicle headlight V201 comprises a light source arrangement VL, for example comprising LEDs, for irradiating light into the light entry surface V111 of the attachment optics V11 or the light entry surfaces V112, V113, V114 and V115, not shown in greater detail, of the attachment optics V12, V13, V14 and V15. In addition, the vehicle headlight V201 comprises a secondary lens V2 manufactured according to a method mentioned above for imaging the light exit surface of the attachment optics V11 or the surface V21 of the attachment optics array V1, which is not shown in more detail. The attachment optics array V1 is preferably made of glass, but may be made as a hybrid optical element for certain applications. For example, when the attachment optics array is fabricated as a hybrid optical element, it is envisaged that the lenses V2011, V2012, V2013, V2014 and V2015 are formed in terms of the coating 12.

Figure 28:
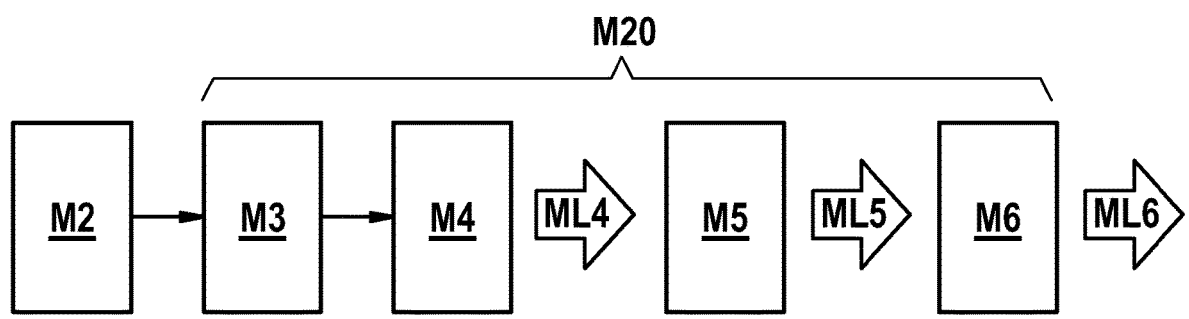
FIG. 28 shows another embodiment of an alternative motor vehicle headlight for use in the motor vehicle shown in FIG. 19.

Another suitable area of use for optical elements or lenses manufactured according to the present disclosure is disclosed, for example, in DE 10 2017 105 888 A1 or the headlight described with reference to FIG. 28 for use instead of the vehicle headlight S1. Thereby, FIG. 28 exemplarily shows a light module (headlight) M20 comprising a light emitting unit M4 with a plurality of point-shaped light sources arranged in a matrix-like manner, each emitting light ML4 (with a Lambertian radiation characteristic), and further comprising a concave lens M5 and a projection lens M6. In the example shown in DE 10 2017 105 888 A1 according to FIG. 28, the projection optics M6 comprises two lenses arranged one behind the other in the beam path, which have been manufactured according to a method corresponding to the aforementioned method. The projection optics M6 images the light ML4 emitted by the light emitting unit M4 and, after passing through the concave lens M5, further shaped light ML5 as a resulting light distribution ML6 of the light module M20 on the roadway in front of the motor vehicle S100 in which the light module M20 or the headlight is (have been) installed.

The light module M20 has a controller, designated by reference number M3, which controls the light emitting unit M4 as a function of the values of a sensor system or ambient sensor system M2 of the motor vehicle S100. The concave lens M5 has a concavely curved exit surface on the side facing away from the light emitting unit M4. The exit surface of the concave lens M5 redirects light ML4 irradiated into the concave lens M5 by the light emitting unit M4 with a large beam angle toward the edge of the concave lens by means of total reflection, so that it does not pass through the projection optics M6. According to DE 10 2017 105 888 A1, light beams emitted at a 'large beam angle' by the light emitting unit M4 are those light beams which (without arrangement of the concave lens M5 in the beam path) would be poorly imaged, for example blurred, on the roadway by means of the projection optics M6 due to optical aberrations and/or which could lead to stray light which reduces the contrast of the image on the roadway (see also DE 10 2017 105 888 A1). It may be provided that the projection optics M6 can only sharply image light with an aperture angle limited to approximately +/−20°. Light beams with aperture angles greater than +/−20°, for example greater than +/−30°, are thus prevented from hitting the projection optics M6 by the arrangement of the concave lens M5 in the beam path.

The light emitting unit M4 can be designed differently. According to one embodiment, the individual point-shaped light sources of the light emitting unit M4 each comprise a semiconductor light source, for example a light emitting diode (LED). The LEDs can be selectively controlled individually or in groups to switch the semiconductor light sources on or off or to dim them. For example, the light module M20 has more than 1,000 individually controllable LEDs. For example, the light module M20 can be designed as a so-called µAFS (micro-structured adaptive front-lighting system) light module.

According to an alternative possibility, the light emitting unit M4 comprises a semiconductor light source and a DLP or micromirror array comprising a plurality of micromirrors that can be individually controlled and tilted, each of the micromirrors forming one of the point light sources of the light emitting unit M4. For example, the micromirror array comprises at least 1 million micromirrors that can be tilted, for example, at a frequency of up to 5,000 Hz.

Figure 29:
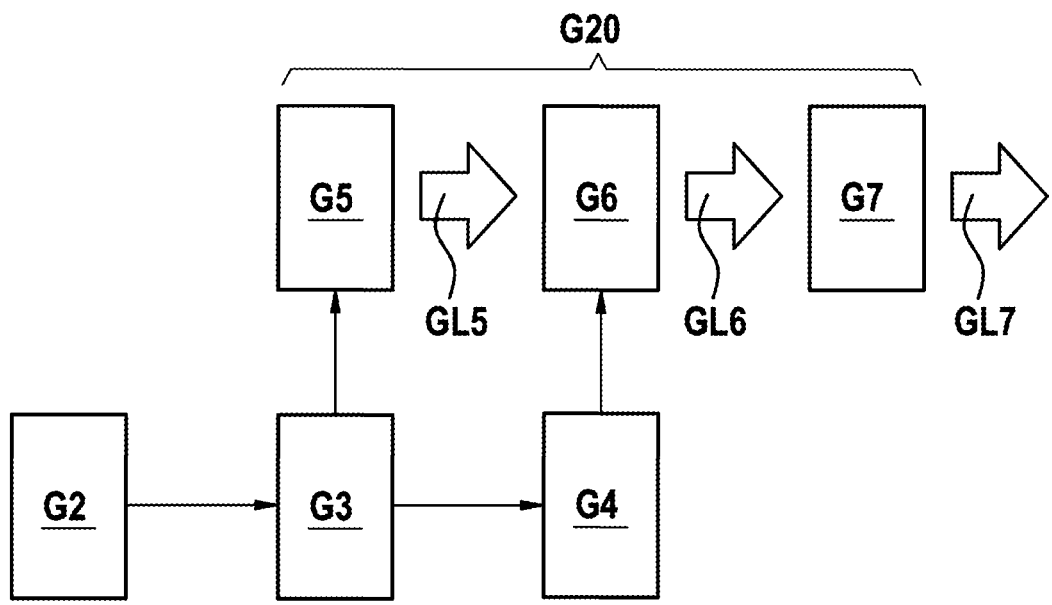
FIG. 29 shows another embodiment of an alternative motor vehicle headlight for use in the motor vehicle shown in FIG. 19.
Figure 30:
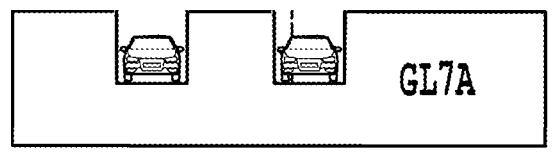
FIG. 30 shows an example of illumination using the motor vehicle headlight shown in FIG. 29.

Another example of a headlight system or light module (DLP system) is disclosed by the Internet link www.al-lighting.com/news/article/digital-light-millions-of-pixels-on-the-road/ (accessed Apr. 13, 2020). A schematically represented corresponding headlight module or vehicle headlight for generating an illumination pattern designated GL7A in FIG. 30 is shown in FIG. 29. The adaptive headlight G20 schematically shown in FIG. 29—which can be used instead of the vehicle headlight S1—is used for situation- or traffic-dependent illumination of the surroundings or the roadway in front of the motor vehicle S100 as a function of surroundings sensors G2 of the motor vehicle S100. Light GL5 generated by the illumination device G5 is formed into an illumination pattern GL6 by means of a system of micromirrors G6, as also shown, for example, in DE 10 2017 105 888 A1, which in turn radiates light GL7 suitable for adaptive illumination in front of the motor vehicle S100 or in an environment on the roadway in front of the motor vehicle S100 by means of projection optics G7 comprising optical elements manufactured in accordance with the aforementioned method. A suitable system G6 of movable micromirrors is disclosed by Internet link Internet link www.al-lighting.com/news/article/digital-light-millions-of-pixels-on-the-road/ (accessed Apr. 13, 2020).

A controller G4 is provided for controlling the system G6 with movable micromirrors. In addition, the headlight G20 comprises a controller G3 both for synchronization with the controller G4 and for controlling the lighting device G5 in response to environmental sensors G2. Details of the controller G3 and G4 can be obtained from the Internet link www.al-lighting.com/news/article/digital-light-millions-of-pixels-on-the-road/ (accessed Apr. 13, 2020). The illumination device G5 may comprise, for example, an LED arrangement or a comparable light source arrangement, an optical system such as a field lens (which, for example, has also been manufactured according to the described method), and also a reflector.

Figure 31:
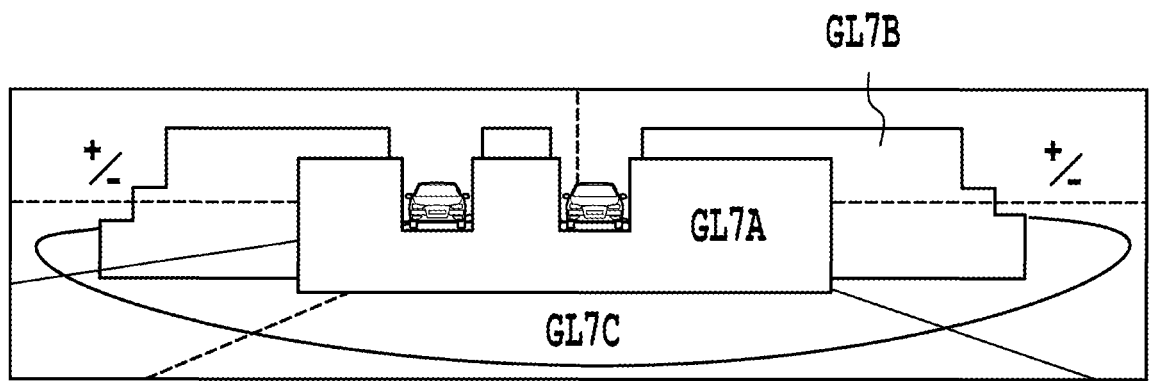
FIG. 31 shows an embodiment example for superimposed illumination using the illumination according to FIG. 30 and the illumination of two further headlight systems or subsystems.

The vehicle headlight G20 described with reference to FIG. 29 can be used for example in conjunction with other headlight modules or headlights to achieve a superimposed overall light profile or illumination pattern. This is shown by way of example in FIG. 31, where the overall lighting pattern is composed of the GL7A lighting pattern, the GL7B and the GL7C. For example, the GL7C illumination pattern can be generated by means of the S1 spotlight and the GL7B illumination pattern can be generated by means of the V201 spotlight.

Figure 32:
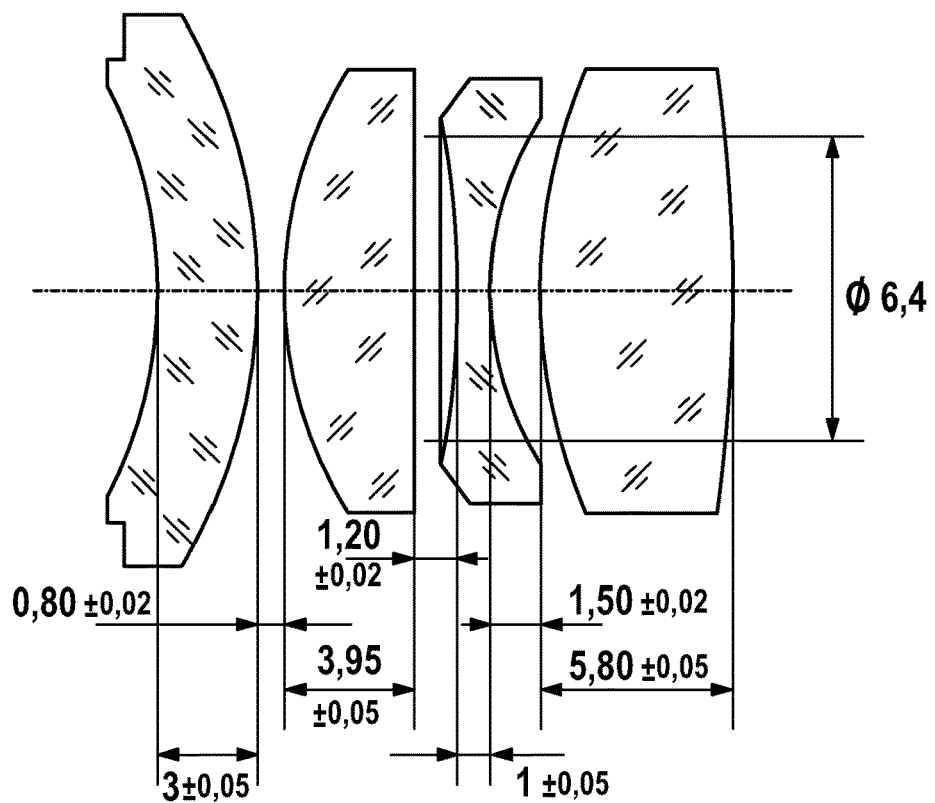
FIG. 32 shows an embodiment of an objective.
Figure 33:
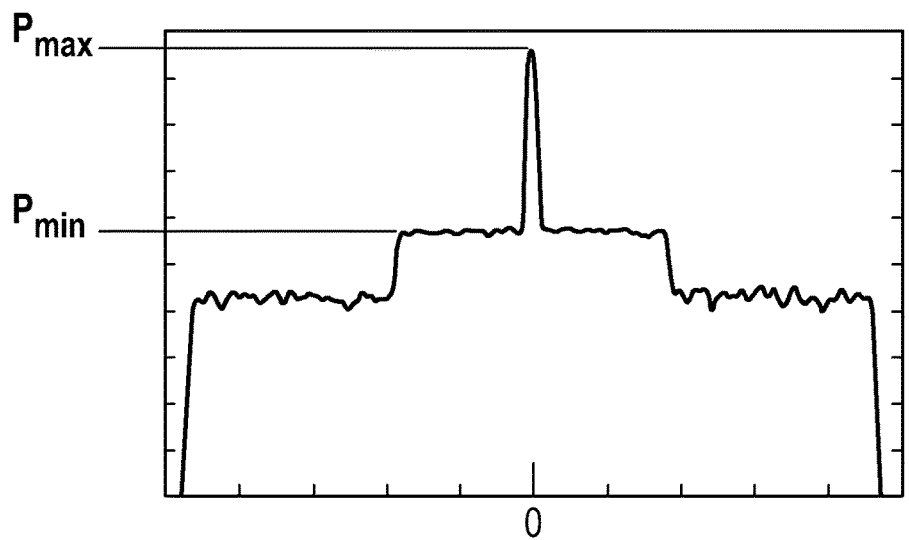
FIG. 33 shows light power, plotted logarithmically versus distance from a considered point of an object.

Sensor technology for the aforementioned headlights comprises for example a camera and an evaluation or pattern recognition system for evaluating a signal supplied by the camera. A camera comprises for example an objective or a multi-lens objective and an image sensor for imaging an image generated by the objective on the image sensor. In a suitable manner, an objective such as that disclosed in U.S. Pat. No. 8,212,689 B2 (incorporated by reference in its entirety) and shown by way of example in FIG. 32 is used. Such an objective is suitable because of the avoidance or considerable reduction of reflected images, since by means of such an objective it is possible, for example, to avoid confusion of a reflected image of an oncoming vehicle with light with a vehicle ahead with light. A suitable objective, for example for infrared light and/or visible light, images an object in an image plane, wherein, with respect to the imaging of an object, for each point within the image circle of the objective or for at least one point within the image circle of the objective, $Pdyn \geq 70$ dB, for example $Pdyn \geq 80$ dB, for example $Pdyn \geq 90$ dB, where Pdyn as illustrated in FIG. xx24 is equal to $10 \cdot \log(Pmax/Pmn)$, where Pmax is the maximum light power of a point in the image plane for imaging a point of the object, and where Pmin is the light power of another point in the image plane for imaging the point of the object, whose light power with respect to imaging the point of the object is greater than the light power of any further point in the image plane with respect to imaging the point of the object, or where Pmin is the maximum light power of the reflected image signals of the point of the object imaged in a further point. The lenses or a part of the lenses of the objective shown in FIG. 32 may be manufactured according to the claimed or disclosed method, it being provided for example that the correspondingly manufactured lenses have a circumferential or partially circumferential edge in deviation from the representation in FIG. 32.

The elements or objects in some figures are drawn with simplicity and clarity in mind, and not necessarily to scale. For example, the scales of some elements are exaggerated relative to other elements to enhance understanding of embodiments of the present disclosure.

The present disclosure specifies an alternative manufacturing process for optical elements. Thereby, a high contour fidelity and/or surface quality for optical elements and/or lenses and/or headlight lenses is achieved. Furthermore, the costs for a manufacturing process of lenses and/or headlights, microprojectors and/or vehicle headlights may be reduced.

LIST OF REFERENCE SIGNS 1 hybrid lens
2, 2A, 2',2" mold
3, 3' handling arrangement
11 partial-optic
12, 12', 12" (optically effective) coating
12F, 12F' liquid transparent material, for example transparent ink, for example comprising material for coating 12 as well as solvent.
21, 21A, 21', 21" carrier mold
22, 22A, 22', 22" impression mold
23A ring segment
25, 35 UV light source
31, 31' suction arrangement
32 press arrangement
33 bellows
41, 42, 43, 44, 45, 46, 47, 48, 49 step or process step
110 convex curved optically effective surface of the partial-optic 11
111 plan area of partial-optic 11
120 convex curved optically effective surface of coating 12
220 impression surface
S1 vehicle headlight
S2 hybrid headlight lens
S3 lens body
S4 convex curved optically effective surface of a coating corresponding to coating 12 of hybrid lens 1.
S5 planar surface of hybrid headlight lens S2
S6 (optically ineffective) edge of hybrid headlight lens S2
S10 light source
S12 reflector
S14 shield
S15 edge of the shield S14
S25 bright-dark boundary
S100 motor vehicle
F2 environmental sensors
F3 controller
F4 lighting device
F5 objective
F20, V201 vehicle headlight
F41 light source arrangement
F42 attachment optics
F421 light exit area of F4
L4 light
L41 light irradiated in F42
L5 lighting pattern
L51 dazzled areas
L52 dimmed areas
L53 curve light V1 attachment optics array
V2 attachment optics, secondary lens
V11, V12, V13, V14, V15 attachment optics
V20 base part
V21 surface from V20
V111, V121, V131,
V141, V151 light entrance area
V115, V125, V135,
V145, V155 side areas
V2011, V2012, V2013,
V2014, V2015 lenses
VL light source arrangement
M2 environmental sensors
M3 controller
M4 light emitting unit
ML4 light
M5 concave lens
ML5 further formed light
M6 projection optic
ML6 resulting light distribution
M20 light module
G20 headlight
G2 environmental Sensors
G3 controller
G4 controller
G5 lighting device
GL5 light generated by GL5
G6 system of micromirrors
GL6 lighting pattern
G7 projection optic
GL7 light
$P_{max}$, $P_{min}$ light power

The invention claimed is:

1. A method for producing an optical lens, the method comprising:
providing a partial-optic with a convexly curved surface made of a first transparent optical material, the first transparent optical material being inorganic glass having a first refractive index;
providing a mold with a concave cavity;
providing a liquid transparent second optical material, the transparent second optical material comprising a hybrid polymer;
placing the liquid transparent second optical material into the concave cavity of the mold;
pressing the partial-optic with the convexly curved surface into the concave cavity of the mold, such that the liquid transparent second optical material forms an optically effective coating on the convexly curved surface of the partial-optic, the optically effective coating having a second refractive index;
curing the optically effective coating by irradiating the optically effective coating with UV light through the partial-optic; and
hardbaking the optically effective coating by heat treatment after curing such that the second refractive index differs from the first refractive index by no more than 20%.

2. The method of claim 1, wherein the convexly curved surface is a press molded surface.

3. The method of claim 2, wherein the curing comprises forming a stable three-dimensional polymer network achieved by UV treatment.

4. The method of claim 1, wherein the inorganic glass is a silicate glass.

5. The method of claim 1, wherein the concave cavity of the mold is formed at least in part by a cavity of an impression mold of a first mold material, the impression mold being arranged in a cavity of a carrier mold made of a second mold material being different than the first mold material, wherein the first mold material is transparent to UV light, wherein the second mold material is transparent to UV light, and wherein the curing comprises irradiating the optically effective coating to UV light through the impression mold and the carrier mold.

6. The method of claim 5, wherein the first mold material comprises silicone.

7. The method of claim 1, wherein optically effective coating is not thicker than 2 mm.

8. The method of claim 1, wherein pressing the partial-optic with the convexly curved surface into the concave cavity of the mold is performed under a pressure which is not greater than 0.5 bar.

9. The method of claim 1, wherein the liquid transparent second optical material is an ink for three-dimensional printing of optical structures.

10. The method of claim 1, wherein a light-diffracting structure is imprinted on the optically active coating by means of the concave cavity of the mold.

11. The method of claim 1, wherein a light-diffracting structure is imprinted on the optically effective coating by means of a surface of the concave cavity of the mold.

12. A method for producing an optical lens, the method comprising:
providing a partial-optic with a press molded convexly curved surface made of a first transparent optical material, the first transparent optical material being silicate glass having a first refractive index;
providing a mold with a concave cavity;
providing a liquid transparent second optical material, the transparent second optical material comprising a hybrid polymer;
placing the liquid transparent second optical material into the concave cavity of the mold;
pressing the partial-optic with the convexly curved surface into the concave cavity of the mold, such that the liquid transparent second optical material forms an optically effective coating on the convexly curved surface of the partial-optic;
curing the optically effective coating by irradiating the optically effective coating with UV light through the mold; and
removing the optical lens from the concave cavity of the mold, wherein the optically effective coating has a second refractive index different from the first refractive index by no more than 20%.

13. The method of claim 12, wherein a light-diffracting structure is imprinted on the optically effective coating by means of the concave cavity of the mold.

14. A method for producing an optical lens, the method comprising:
providing a partial-optic with a coating surface made of a first transparent optical material, the first transparent optical material being silicate glass having a first refractive index;
providing a mold with a cavity;
providing a liquid transparent second optical material, the transparent second optical material comprising a hybrid polymer;
applying the liquid transparent second optical material on top of the coating surface;
pressing the partial-optic with the coating surface into the cavity of the mold, such that the liquid transparent second optical material forms an optically effective coating on the coating surface;

curing the optically effective coating by irradiating with UV light; and afterwards, removing the optical lens from the concave cavity of the mold, wherein the optically effective coating has a second refractive index different from the first refractive index by no more than 20%.

15. The method of claim 14, wherein the partial-optic being a planar-convex lens, wherein the coating surface is a planar surface.

16. The method of claim 15, wherein a light-diffracting structure is imprinted on the optically effective coating by means of the cavity of the mold.

17. The method of claim 14, wherein the coating surface is a convex surface.

18. The method of claim 17, wherein a light-diffracting structure is imprinted on the optically effective coating by means of the cavity of the mold.

19. The method of claim 1, wherein the curing comprises irradiating the optically effective coating with UV light through the mold.

\* \* \* \* \*